(12) United States Patent
Nair et al.

(10) Patent No.: US 9,174,842 B2
(45) Date of Patent: Nov. 3, 2015

(54) SINGLE-WALLED METAL OXIDE AND METAL SULPHIDE NANOTUBES/POLYMER COMPOSITES

(75) Inventors: Sankar Nair, Atlanta, GA (US); Dun-Yen Kang, Atlanta, GA (US); Christopher W. Jones, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 43 days.

(21) Appl. No.: 13/608,768

(22) Filed: Sep. 10, 2012

(65) Prior Publication Data

US 2013/0096245 A1    Apr. 18, 2013

Related U.S. Application Data

(60) Provisional application No. 61/547,553, filed on Oct. 14, 2011.

(51) Int. Cl.
*B82Y 30/00*    (2011.01)
*B82Y 40/00*    (2011.01)

(52) U.S. Cl.
CPC *B82Y 30/00* (2013.01); *B82Y 40/00* (2013.01)

(58) Field of Classification Search
CPC .... B82Y 30/00; B82Y 40/00; C02F 2305/08; B01D 67/0079; B01D 69/125; B01D 69/148; B01D 71/024; B01D 71/025; B01D 71/027; B01D 71/028; B01D 71/38
IPC ............................................ B82Y 30/00, 40/00
See application file for complete search history.

(56) References Cited

U.S. PATENT DOCUMENTS

| 4,874,518 | A  |   | 10/1989 | Kirkland et al. |
|---|---|---|---|---|
| 2002/0090330 | A1 |   | 7/2002 | Smalley et al. |
| 2003/0026754 | A1 | * | 2/2003 | Clarke et al. ............... 423/447.2 |
| 2004/0048744 | A1 |   | 3/2004 | Iijima et al. |
| 2008/0213487 | A1 |   | 9/2008 | Park et al. |
| 2010/0117032 | A1 | * | 5/2010 | Grigorian et al. ............ 252/507 |
| 2010/0224555 | A1 | * | 9/2010 | Hoek et al. ............... 210/500.42 |
| 2011/0230672 | A1 |   | 9/2011 | Kang et al. |

OTHER PUBLICATIONS

Yucelen (Formation of Single-Walled Aluminosilicate Nanotubes from Molecular Precursors and Curved Nanoscale Intermediates. J. Am. Chem. Soc., 2011, 133, pp. 5397-5412).*
Zhang (Flexibility of Ordered Surface Hydroxyls Influences the Adsorption of Molecules in Single-Walled Aluminosilicate Nanotubes. J. Phys. Chem. Lett., 2010, 1, pp. 1235-1240).*
Yamamato (Transparent polymer nanohybrid prepared by in situ synthesis of aluminosilicate nanofibers in poly(vinyl alcohol) solution. Soft Matter, 2005, pp. 372-377).*

(Continued)

*Primary Examiner* — Brieann R Fink
(74) *Attorney, Agent, or Firm* — Chris P. Perque; Teresa J. Lechner-Fish; Gardere Wynne Sewell LLP

(57) ABSTRACT

The present invention discloses a nanocomposite material having single-walled aluminosilicate nanotube in polymer, a membrane comprising such nanocomposite material, and the method of making the nanocomposite material, in which the composite material has high volume fraction of well-dispersed nanotubes. A gel-phased single-walled aluminosilicate nanotube is first prepared and then mixed with a polymer matrix to yield the composite material.

21 Claims, 16 Drawing Sheets

(56) References Cited

OTHER PUBLICATIONS

International Search Report issued Jun. 16, 2011 for PCT/US2011/028649.

International Written Opinion issued Jun. 16, 2011 for PCT/US2011/028649.

International Preliminary Report on Patentability issued Sep. 25, 2012 for PCT/US2011/028649.

Li, Lijuan, et al. "The Electronic Structure of a Single-walled Aluminosilicate Nanotube." Nanotechnology, 19(17) (2008) pp. 175702.

Lvov, et al., "Halloysite Clay Nanotubes for Controlled Release of Protective Agents." ACS Nano, 2(5), pp. 814-820, May 2008.

Yang, et al., "Growth Mechanism of Synthetic Imogolite Nanotubes." Chem. Mater., 20(13) (2008) pp. 4484-4488.

Yuan, et al., Functionalization of Halloysite Clay Nanotubes by Grafting with Gamma-Aminopropyltriethoxysilane, J. Phys. Chem. C, 112 (2008) pp. 15742-15751.

Zheng, Shanfeng, "Syntheis and Modifications of Metal Oxide Nanostructures and Their Applications." Queensland University of Technology School of Physical and Chemical Sciences Inorganic Materials Research Group (1999), p. 61.

Bac, et al., *Surface-modified aluminogermanate nanotube by OPA: Synthesis and characterization*, Inorganic Chem. Comm. 12(10) (Oct. 2009) 1045-1048.

Farmer, et al., *Synthesis of imogolite: a tubular aluminum silicate polymer*, J. Chem. Soc. Chem. Comm. 13 (1977) 462-463.

Kang, et al., *Dehydration, dehydroxylation, and rehydroxylation of single-walled aluminosilicate nanotubes*, ACS Nano 4(8) (2010) 4897-4907.

Kang, et al., *Modeling molecular transport in composite membranes with tubular fillers*, J. Membr. Sci. 381 (2011) 50-63.

Konduri, et al., *Controlling nanotube dimensions: Correlation between composition, diameter, and internal energy of single-walled mixed oxide nanotubes*, ACS Nano 1(5) (2007) 393-402.

Konduri, et al., *Water in single-walled aluminosilicate nanotubes: Diffusion and adsorption properties*, J. Phys. Chem. C 112(39) (Oct. 2, 2008) 15367-15374.

Ma, et al., *Poly(methyl methacrylate) grafted imogolite nanotubes prepared through surface-initiated ARGET ATRP Inorganic*, Chem. Comm. 47(20) (May 28, 2011) 5813-5815.

Mukherjee, et al., *Phenomenology of the growth of single-walled aluminosilicate and aluminogermanate nanotubes of precise dimensions*, Chem. Mater. 17(20) (Oct. 4, 2005) 4900-4909.

Wada, et al., *Synthetic allophane and imogolite*, J. Soil Sci. 30 (1979) 347-355.

Zang, et al., *Self-diffusion of water and simple alcohols in single-walled aluminosilicate nanotubes*, ACS Nano 3(6) (2009) 1548-1556.

PCT Nov. 20, 2012 International Search Report and Written Opinion mailed in PCT/US2012/054404.

Huang, et al., *Multilayer poly(vinyl alcohol)-zeolite 4A composite membranes for ethanol deyhdration by means of pervaporation*, Separation & Purification Technology 51 (2006) 126-136.

Johnson, et al., *Tubular silicate-layered silicate intercalation compounds: A new family of pillared clays*, J. Am. Chem. Soc. 110(25) (1988) 8545-8547.

Apr. 30, 2013 Office Action mailed in U.S. Appl. No. 13/049,375, filed Mar. 16, 2011.

Jul. 9, 2013 Amendment and Response to Office Action mailed on Apr. 30, 2013 in U.S. Appl. No. 13/049,375, filed Mar. 16, 2011.

Aug. 1, 2013 Notice of Allowance/Allowability mailed in U.S. Appl. No. 13/049,375, filed Mar. 16, 2011.

JP Mar. 3, 2014 Office Action mailed in international patent application JP 2013-500178 (with English translation).

KR Dec. 17, 2013 Office Action mailed in international patent application KR 10-2012-7022700 (with English translation).

KR Apr. 28, 2014 Decision to Reject a Patent mailed in international patent application KR 10-2012-7022700 (with English translation).

Mukherjee, *Synthesis, characterization, and growth mechanism of single-walled metal oxide nanotubes* (a Ph.D. dissertation, Georgia Institute of Technology 2007).

Barron, et al., *Detection of imogolite in soils using solid state $^{29}Si$ NMR*, Nature 299(5884) (Oct. 14, 1982) 616-618.

Bollini, et al., *Amine-oxide hybrid materials for acid gas separations*, J. Mater. Chem. 21(39) (Oct. 21, 2011) 15100-15120.

Bollini, et al., *Oxidative degradation of aminosilica adsorbents relevant to postcombustion $CO_2$ capture*, Energy Fuels 25 (2011) 2416-2425.

Bottero, et al., *Synthesis and characterization of hybrid organic/inorganic nanotubes of the imogolite type and their behavior towards methane adsorption*, Phys. Chem. Chem. Phys. 13(2) (Jan. 14, 2011) 744-750.

Brunelli, et al., *Tuning cooperativity by controlling the linker length of silica-supported amines in catalysis and $CO_2$ capture*, J. Am. Chem. Soc. 134 (2012) 13950-13953.

Cambedouzou, et al., *On the diffraction pattern of $C_{60}$ peapods*, Eur. Phys. J. B 42 (2004) 31-45.

Choi, et al., *Adsorbent materials for carbon dioxide capture from large anthropogenic point sources*, ChemSusChem 2 (2009) 796-854.

Ek, et al., *A $^{23}Si$ and $^{13}C$ CP/MAS NMR study on the surface species of gas-phase-deposited delta-aminopropylalkoxysilanes on heat-treated silica*, J. Phys. Chem. B 108(31) (2004) 11454-11459.

Giambastiani, et al., *Functionalization of multiwalled carbon nanotubes with cyclic nitrones for materials and composites: Addressing the role of CNT sidewall defects*, Chem. Mater. 23 (2011) 1923-1938.

Grey, et al., *Determination of the quadrupole coupling constant of the invisible aluminum spins in zeolite HY with $^{1}H/^{27}Al$ TRAPDOR NMR*, J. Am. Chem. Soc. 117(31) (Aug. 9, 1995) 8232-8242.

Hoffman, et al., *Silica-based mesoporous organic-inorganic hybrid materials*, Angew. Chem. Int. Ed. 45(20) (May 4, 2006) 3216-3251.

Holland, et al., *Location and orientation of adsorbed molecules in zeolites from solid-state REAPDOR NMR*, Phys. Chem. Chem. Phys. 7(8) (Apr. 21, 2005) 1739-1742.

Iijima, *Helical microtubules of graphitic carbon*, Nature 354(6348) (Nov. 7, 1991) 56-58.

Jones, et al., *Organic-functionalized molecular sieves as shape-selective catalysts*, Nature 393 (May 7, 1998) 52-54.

Jones, et al., *Organic-functionalized molecular sieves (OFMSs): II. Synthesis, characterization and the transformation of OFMSs containing non-polar functional groups into solid acids*, Microporous Mesoporous Mater. 33(1-3) (Dec. 15, 1999) 223-240.

Kang, et al., *Single-walled aluminosilicate nanotubes with organic-modified interiors*, J. Phys. Chem. C 115 (2011) 7676-7685.

Kang, et al., *Single-walled aluminosilicate nanotube/poly(vinyl alcohol) nanocomposite membranes*, ACS Appl. Mater. Interfaces 4 (2012) 965-976.

Karousis, et al., *Current progress on the chemical modification of carbon nanotubes*, Chem. Rev. 110(9) (2010) 5366-5397.

Kuzmany, et al., *Functionalization of carbon nanotubes*, Synth. Met. 141 (2004) 113-122.

Levard, et al., *Formation and growth mechanisms of imogolite-like aluminogermanate nanotubes*, Chem. Mater. 22(8) (2010) 2466-2473.

Ma, et al., *Dispersion and functionalization of carbon nanotubes for polymer-based nanocomposites: A review*, Composites: Part A 41 (2010) 1345-1367.

Maillet, et al., *Growth kinetic of single and double-walled aluminogermanate imogolite-like nanotubes: An experimental and modeling approach*, Phys. Chem. Chem. Phys. 13(7) (Feb. 21, 2011) 2682-2689.

Majumder, et al., *Mass transport through carbon nanotube membranes in three different regimes: Ionic diffusion and gas and liquid flow*, ACS Nano 5(5) (2011) 3867-3877.

Mukherjee, et al., *Short, highly ordered, single-walled mixed-oxide nanotubes assemble from amorphous nanoparticles*, J. Am. Chem. Soc. 129(21) (May 30, 2007) 6820-6826.

Singh, et al., *Carbon nanotube surface science*, Int. J. Nanotechnol. 5(9-12) (2008) 900-929 (Invited Review).

(56) References Cited

OTHER PUBLICATIONS

Singh, et al., *Organic functionalisation and characterisation of single-walled carbon nanotubes*, Chem. Soc. Rev. 38 (2009) 2214-2230.

Stein, et al., *Hybrid inorganic-organic mesoporous silicates—nanoscopic reactors coming of age*, Adv. Mater. 12(19) (Oct. 2, 2000) 1403-1419.

Tagliabue, et al., *Natural gas treating by selective adsorption: Material science and chemical engineering interplay*, Chem. Eng. J. 155 (2009) 553-566.

Theng, et al., *Surface properties of allophane, halloysite, and imogolite*, Clays & Clay Minerals 30(2) (1982) 143-149.

Tsuji, et al., *Organic-functionalized molecular sieves (OFMSs) I. Synthesis and characterization of OFMSs with polar functional groups*, Microporous Mesoporous Mater. 29(3) (1999) 339-349.

Vairavapandian, et al., *Preparation and modification of carbon nanotubes: Review of recent advances and applications in catalysis and sensing*, Anal. Chim. Acta 626 (2008) 119-129.

Venkatasubramanian, et al., *Gas adsorption characteristics of metal-organic frameworks via quartz crystal microbalance techniques*, J. Phys. Chem. C 116 (2012) 15313-15321.

Yanagi, et al., *Photosensitive function of encapsulated dye in carbon nanotubes*, J. Am. Chem. Soc. 129(16) (Apr. 25, 2007) 4992-4997.

Yucelen, et al., *Formation of single-walled aluminosilicate nanotubes from molecular precursors and curved nanoscale intermediates*, J. Am. Chem. Soc. 133 (2011) 5397-5412.

Yucelen, et al., *Shaping single-walled metal oxide nanotubes from precursors of controlled curvature*, Nano Lett. 12 (2012) 827-832.

Zanzottera, et al., *Physico-chemical properties of imogolite nanotubes functionalized on both external and internal surfaces*, J. Phys. Chem. C 116 (2012) 7499-7506.

JP Dec. 2, 2014 Final Office Action mailed in international patent application JP 2013-500178 (with English translation).

Jul. 24, 2015 Office Action mailed in U.S. Appl. No. 14/482,552, filed Sep. 10, 2014.

* cited by examiner

SINGLE-WALLED METAL OXIDE AND METAL SULPHIDE NANOTUBES/POLYMER COMPOSITES

PRIORITY CLAIM

This application claims priority to 61/547,553, filed Oct. 14, 2011 and incorporated by reference herein in its entirety.

FIELD OF THE INVENTION

The invention relates to a nanocomposite membrane having high water/ethanol selectivity, and particularly to a nanocomposite membrane having single-walled nanotubes (SWNTs)/polymer that exhibits good water/ethanol selectivity.

BACKGROUND OF THE INVENTION

The synthesis, properties, and applications of nanotube materials have been extensively studied for more than two decades. Nanotubes are of single-layered or multiple-layered structure wrapped into a cylindrical shape. Nanotubes, especially carbon nanotubes, generally have a diameter of 1 nanometer, but may extend to several micrometers in length. Carbon nanotubes have been found to possess good mechanical, electrical, thermal, and mass transport properties and can be incorporated into other solid phase materials as nanoscale fillers.

The mechanical, electrical or heat/mass transport properties of such nanocomposites exhibit a strong dependence on the filler volume fraction. Previous studies have also suggested that uniformity of the nanotube dispersion in the matrix material plays a critical role in the performance enhancement. For example, carbon nanotube/polymer composite membranes with non-ideal nanotube dispersion (i.e. aggregation of nanotubes in the matrix due to the incompatibility between the outer surface of the carbon nanotubes and the matrix materials) were found to yield low molecular selectivity, where the aggregation may result in nanotube lumps of 100 micrometers in diameter or larger.

Furthermore, the nanotube dispersion and defect areas in carbon nanotube-based composite membranes are not yet fully characterized. As a result, the relative contributions to mass transport from the dispersed nanotubes (pore size <10 nm) and the defect regions (of size ~1 μm) are unclear.

To address the problem of increasing the nanotube loading in nanocomposites while maintaining good dispersion, a range of techniques for outer surface modification of carbon nanotubes have been developed, such as the use of surfactants or in situ polymerization to enhance the nanotube compatibility with the polymeric matrix. Nevertheless, the highest volume fraction reported to date of carbon nanotubes dispersed in a polymeric material without significant nanotube aggregation is only about 20%. This limitation hinders the performance enhancement that the nanotubes can potentially create in a composite material or membrane.

The limits on carbon nanotube loading in composite materials are likely related to the difficulty of dispersing the nanotubes individually in a liquid prior to preparing the solid-phase composite. However, individual dispersion of nanotubes in polar liquids can be achieved in the case of metal oxide nanotubes that are synthesized hydrothermally or solvothermally and have polar surfaces. Single walled aluminosilicate nanotubes (SWNTs, FIG. 1), which are synthetic analogues of the nanotubular mineral imogolite, can be synthesized hydrothermally with a high degree of dispersion.[1-4]

These SWNTs are hypothesized to be amenable to the fabrication and application of high-loading nanotube composites with near-ideal dispersion of nanotubes. Furthermore, previous studies have suggested that aluminosilicate SWNTs possess extraordinarily high interior hydrophilicity due to their high inner surface silanol densities, and membranes incorporating them have been predicted to exhibit excellent water transport properties and good water/alcohol selectivity.[6-8] The transport properties of these materials can also be controlled by internal surface modification and tuning of the nanotube diameter. Additionally, aluminogermanate nanotubes, a nanomaterial that is structurally analogous to the aluminosilicate nanotube but shorter in length and larger in external diameter, has been surface-modified by octadecylphosphonic acid.[12] The surface-modified aluminogermanate nanotube exhibited increase dispersibility in hydrophobic solvents, suggesting potential applications in membranes. Therefore, SWNT/polymer composite membranes are interesting candidates for applications in water/organics separations (e.g., water/ethanol separation as encountered in biofuel production).

Most of current studies focus on the composite materials comprising carbon nanotubes and polymers. For example, US20100160553 discloses a method for dispersing carbon nanotubes in a SWNT/polymer composite, especially by fragmentation of carbon nanotubes by first embedding carbon nanotubes within a catalyst for polymerization, and then performing the polymerization reaction that is known to fracture the catalyst to 0.1 micrometer range. However, such method still has the disadvantage in that only a limited percentage of well-dispersed nanotubes can be included in the composite material (E.g., [0073]: "The SWNT-polymer composite more preferably may comprise up to 0.1%-3% SWNTs"), and therefore limits the physical characteristics of the composite material.

Therefore, there is the need in the art for a method for preparing a well dispersed metal oxide single-wall nanotube SWNT/polymer composite material that has high volume fraction of the SWNT and has enhanced water permeability and/or water/alcohol selectivity.

SUMMARY OF THE INVENTION

In the present invention, we disclose the preparation, characterization, and permeation properties of polymer/SWNT composite membranes with high loading and near-ideal dispersion of nanotubes. Specifically, the loading of well-dispersed SWNTs in poly(vinyl alcohol) (PVA) membranes was systematically increased at least 30% or 35%, and even 38% by volume.

The importance of initial dispersion of the SWNTs in a liquid medium was highlighted by comparison of membranes fabricated using SWNT gels and SWNT powders as starting materials. The microstructure of the composite membranes was assessed qualitatively and quantitatively by scanning electron microscopy (SEM), energy dispersive spectroscopy (EDS), 2D X-ray diffraction (XRD) with respect to $2\theta$ and $\phi$, small-angle X-ray scattering (SAXS) and solid-state NMR.

Subsequently, the permeation properties of the PVA/SWNT composite membranes were studied by water/ethanol pervaporation measurements, and the results analyzed in terms of recently developed models for transport in polymer/nanotube composite membranes as well as with predictions from molecular simulation studies.

Various embodiments of the invention are now described in more detail. In one embodiment, a method of making a well dispersed metal oxide or metal sulphide single-walled nanotube (SWNT)/polymer composite material is provided, comprising: preparing a gel-phase metal oxide or metal sulphide SWNT; mixing said gel-phase metal oxide or metal sulphide SWNT with a polymer; and obtaining a SWNT/polymer composite with at least as 30%, 35% or 38% volume fraction of the metal oxide or metal suphide SWNT.

In another embodiment, is a method of making a well dispersed aluminosilicate single-walled nanotube (SWNT)/ poly(vinyl alcohol) (PVA) composite material, comprising: preparing a gel-phase aluminosilicate SWNT; mixing said gel-phase aluminosilicate SWNT with an aqueous solution of PVA; and obtaining an aluminosilicate SWNT/PVA composite, wherein the aluminosilicate SWNT/PVA composite has as much as 38% volume fraction of said aluminosilicate SWNT.

The gel synthesis method can be any known in the art or developed, but in preferred embodiments includes mixing a stoichiometric amount of an aluminum source, oxide source, and silicon source; adding an aqueous acid to mixture, followed by stirring; stirring at an elevated temperature; adding a base to cooled mixture until gelation of suspended nanotubes occurs; and, optionally, isolating the gel and re-dispersing said suspended nanotubes by adding a small amount of concentrated hydrochloric acid to the gel and/or further purifying the gel.

In another variation, the gel synthesis method includes mixing a stoichiometric amount of tetraethyl orthosilicate with aluminum-tri-sec-butoxide; adding an aqueous perchloric acid solution to the mixture of step a-1) with a molar ratio Si:Al:HClO$_4$ of about 1.1:2:1, followed by stirring; diluting the solution with deionized water by a factor of 3.5-4 and stirring the diluted solution at an elevated temperature; adding a 30 wt % ammonia solution until gelation of suspended nanotubes occurs; and isolating the gel and re-dispersing said suspended nanotubes by adding a small amount of concentrated hydrochloric acid to the gel; and, optionally, purifying the gel.

Other embodiments include the SWNT/polymer composites produced by the methods herein. In particular, the invention provides a metal oxide SWNT/polymer composite material having ≥30-38% volume fraction of SWNT, wherein the SWNT is well dispersed throughout the polymer. Further, one can crosslink the SWNT and the polymer. wherein the metal oxide SWNT comprises aluminosilicate. Preferably, the polymer is poly(vinyl alcohol), the metal oxide SWNT is aluminosilicate SWNT. Also, the SWNT/polymer composite material is preferably ≤0.5 micron thick and is further supported with a second porous polymer layer.

The polymer is selected from the group consisting of crystalline polymers, semicrystalline polymers, glassy polymers, rubbery polymers, poly(vinyl alcohol), cellulose acetate, polyimides, polysulfones, polyalkylsiloxanes, polyimide, poly(methyl methacrylate), poly(3-octylthiophene), poly-p-phenylene(vinylene), polyacrylonitrile, polybutadiene, polystyrene, polypropylene, polypyrrole, poly(p-phenylene benzobisoxazole), epoxy, and combinations thereto, but in one preferred embodiment is poly(vinyl alcohol).

Other embodiments include membranes made using the methods and SWNT/composites of the invention, and methods of using same. One embodiment is a membrane comprising a metal oxide SWNT/polymer composite material having as much as 38% volume fraction of SWNT that is well dispersed in the polymer, wherein the membrane has a water/ ethanol selectivity of at least 35 at 60° C.

As used herein, the term "metal oxide" or "metal sulphide" SWNTs refers to a metal oxide or metal sulphide known to be capable of forming nanotubes, as opposed to nanotubes made of carbon. The differences of metal oxide/metal sulphide SWNTs and carbon SWNTs lie not only in the material, but also the electrical, physical and chemical characteristics. For example, metal oxide SWNTs can show polarity while carbon SWNTs cannot, resulting in metal oxide SWNTs having better dispersion in aqueous solution than carbon SWNTs.

As used herein, the term "well-dispersed" refers to the effect that the SWNTs as existed in the SWNT/polymer composite do not aggregate in bulk, and more specifically refers to SWNTs that exist in the SWNT/polymer composite as a single nanotube or as a small bundles of ≤3-4 nanotubes per bundle.

As used herein, the term "high volume fraction" refers to the volume fraction of the SWNTs in the SWNT/polymer composite material being higher than 30%. In one embodiment, high volume fraction refers to a volume fraction higher than 35%. In another embodiment, high volume fraction can be as high as 38%.

As used herein, the term "single-walled nanotube" refers to nanotubes having a single atom or molecular layer in a seamless cylinder structure. The term is used as opposed to double-walled or multi-walled nanotubes, in which more than one layer is used in forming the nanotubes.

As used herein, the term "gel-phased SWNT" refers to SWNT prepared in a gel phase as opposed to SWNT prepared as powder or other non-gel form.

As used herein, the term "water/ethanol selectivity" of a membrane is defined as the ratio of water permeability to ethanol permeability.

As used herein, % is volume % unless indicated otherwise.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise," "have," "include," and "contain" (and their variants) are open-ended linking verbs and allow the addition of other elements when used in a claim. The phrase "consisting of" is closed, and excludes additional elements. The phrase "consisting essentially of" excludes additional material elements, but allows the inclusions of non-material elements that do not substantially change the nature of the invention.

The following abbreviations are used herein:

| | |
|---|---|
| EDS | Energy dispersive spectroscopy |
| CP | Cross-polarization |
| GCMC | Grand Canonical Monte Carlo |
| GC | Gas chromatograph |
| HC | Hamilton-Crosser model |
| KJN | Kang-Jones-Nair |
| MD | Molecular dynamics |
| NT | nanotube |
| PVA | Poly(vinyl alcohol) |
| SAXS | Small-angle X-ray scattering |
| SEM | Scanning electron microscopy |
| SWNT | Single-walled nanotube |
| TEOS | Tetraethyl orthosilicate |
| XRD | 2D X-ray diffraction |
| KJN | Kang-Jones-Nair model |
| kDa | Kilo-Daltons |
| OPA | Octadecylphosphonic acid |

In one aspect of the present invention, a method of making a well dispersed metal oxide or metal sulphide single-walled nanotubes (SWNTs)/polymer composite material that has as much as 38% volume fraction of SWNTs is provided. The method comprises the steps of: (a) preparing a gel-phased SWNT, (b) mixing the gel-phase SWNT with a polymer matrix, and (c) obtaining the SWNT/polymer composite.

In this method, the metal oxide SWNT can be any metal oxide that is capable of forming SWNTs, and in one embodiment, the metal oxide SWNT is aluminosilicate SWNT. Other embodiments include iron, tungsten, boron, silicon, titanium, molybdenum, copper, and bismuth oxide nanotubes. Metal sulphide nanotubes are also contemplated.

In this method, the polymer is not limited, so long as it shows excellent water permeability and/or water/alcohol selectivity. Thus, the polymers include, but are not limited to, crystalline/semicrystalline, glassy, or rubbery polymers, for example poly(vinyl alcohol), cellulose acetate, polyimides, polysulfones, polyalkylsiloxanes, poly(methyl methacrylate), poly(3-octylthiophene), poly-p-phenylene(vinylene), polyacrylonitrile, polybutadiene, polystyrene, polypropylene, polypyrrole, poly(p-phenylene benzobisoxazole), epoxy, and variations and combinations thereof.

Another aspect of the present invention provides a metal oxide SWNT/polymer composite material that has as much as 38% volume fraction of SWNT that is well-dispersed in the polymer.

In yet another aspect of the present invention, it is provided a membrane comprising a metal oxide SWNT/polymer composite material having as much as 38% volume fraction of SWNT that is well dispersed in the polymer, wherein the membrane has a water/alcohol selectivity of at least 35 at 60° C.

DESCRIPTION OF EMBODIMENTS OF THE INVENTION

Figure 1:
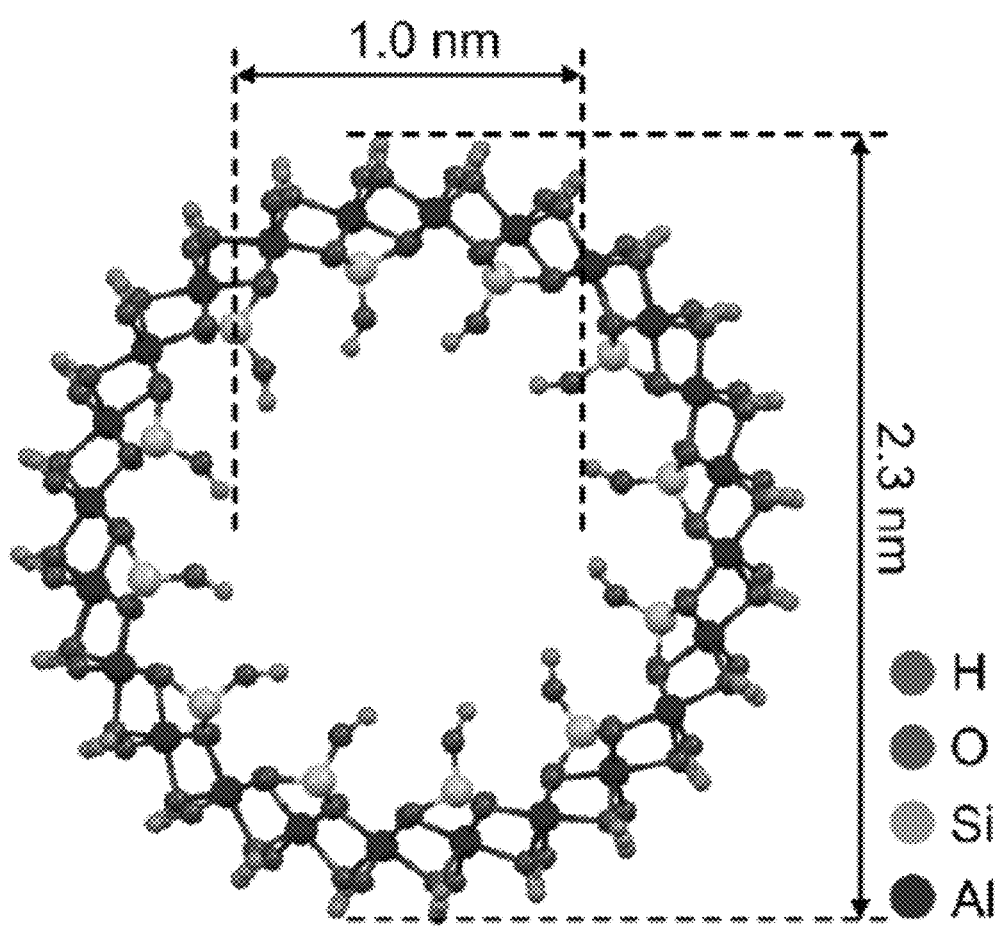
FIG. 1. Structure of the aluminosilicate single-walled nanotube.

The present invention is exemplified with respect to a metal oxide or metal sulphide SWNT/polymer composite material having well-dispersed SWNT of high volume fraction, the membrane comprising the same, and the method of making the same. However, the following examples are exemplary only, and the invention can be broadly applied to metal oxide or metal sulphide SWNT/polymer composite materials. The following detailed discussions are intended to be illustrative only, and not unduly limit the scope of the appended claims.

Preparation of SWNT Gel

Tetraethyl orthosilicate (TEOS) was mixed with aluminum-tri-sec-butoxide in a glove box filled with nitrogen. The mixture was added to an aqueous 75 mM perchloric acid solution with a molar ratio Si:Al:HClO$_4$=1.1:2:1, under vigorous stirring at room temperature in ambient conditions for 24 hrs. The solution was then diluted with DI water by a factor of 3.8 and was stirred at 95° C. for 4 days. Once the temperature was brought to 95° C., the solution turned from cloudy to clear in about one hour.

After the solution was cooled to room temperature, a 30 wt % ammonia solution was added dropwise until gelation of the suspended nanotubes occurred. The gel was isolated by centrifugation at 7000 rpm for 10 min. The supernatant was discarded and a few drops of 10 N hydrochloric acid were added to the gel, thereby re-dispersing the nanotubes. The resulting gel was purified by dialysis against DI water for 3 days using a membrane with a molecular weight cutoff of 15 kDa.

Part of the purified suspension was used to prepare PVA/SWNT-gel composite membranes (see below), and the remaining part was dried at 60° C. and then ground lightly to obtain a powder sample of the SWNTs for preparing PVA/SWNT-powder membranes. Approximately one gram of SWNT powder sample was obtained by a one liter synthesis batch.

Alternatively, SWNT gels can be prepared using aluminum chloride as the metal source. Here, aluminum chloride and germanium ethoxide, in a 1.8 mole ratio, are stirred for 1 hour at room temperature in DI water. NaOH (0.1N) is added at a rate of 0.5 ml/min to bring the pH of the mixture to 5.0. The pH is then adjusted to 4.5 using HCl (0.1M) and CH$_3$COOH (0.2M). The solution is then stirred for 3 hours at room temperature before being heated at 98° C. for 2 days. After being cooled to room temperature, the mixture is flocculated by adjusting the pH to 8.0 using a 0.1 N ammonia solution. The solution is centrifuged at 5000 rmp for 20 min to collect the settled gel. The gel is acidified with a few drops of 35% HCl and dialyzed using cellulose packs against DI water for 2-3 days. The DI water is replaced every 5 hours.

Preparation of SWNT Organic Gel from SWNT Powder

SWNT powder sample was dispersed in aqueous solution (2.6 mg/mL, 200 mL, pH=5) mixed with the aqueous solution of 8-(2-bromo-2-methylpropanoyloxy) octyl phosphate (BMPOPO$_4$(NH$_4$)$_2$) (1.6 g in 50 mL 0.1 M acetate buffer, pH=5.0) under magnetic stirring at room temperature for 48 hours. The white product was collected by filtration and washed with THF:H$_2$O (volume ratio of 1:1) by several dispersion-centrifugation cycles, followed by freeze-drying with benzene to give a white powder of modified SWNT.

A process called activators regenerated by electron transfer for atom transfer radical polymerization (ARGET ATRP) was employed for surface initiated polymerization. In a typical recipe, CuBr$_2$ (3.0 mg, 0.0134 mmol) and pentamethyldiethylenetriamine (PMDETA) (23.2 mg, 0.134 mmol) were dissolved in anisole (10.0 mL). After the formation of Cu(II) complex, modified SWNT (50.0 mg), ascorbic acid (21.8 mg, 0.124 mmol) and methyl methacrylate (MMA) (10.0 g, 100 mmol) were added. The above mixture was sealed with a rubber septum and deoxygenated by argon bubbling for 5 min at room temperature and subsequently placed in an oil bath thermostated at 40° C. The polymerization was stopped by opening the flask and exposing the catalyst to air. Polymeric products were isolated by precipitation from methanol and finally dried under vacuum at 50° C. for 6 hours. The resulting product was then dispersed in organic solvents (eg. chloroform) and form organic SWNT gel.

Preparing Composites Using SWNT Powder

As a comparative example, some composites were made using SWNT powder, as opposed to the inventive method which uses gel.

The SWNT powder sample was weighed and mixed with 30 mL of PVA aqueous solution at room temperature. The total mass of SWNT and PVA was 400 mg and the mass fractions of SWNT were controlled at 0.1, 0.2, 0.3, and 0.4 respectively. The resulting PVA/SWNT mixture was gently stirred for 18 hours at room temperature. The mixture was then poured into a polystyrene petri dish and the membrane was cast at 60° C. for 24 hours. The resulting composite membrane was removed from the petri dish and placed in a crosslinking bath containing 50 mL of water, 50 mL of acetone, 0.5 g of 98 wt % sulfuric acid, and 1.25 g of 25 wt % glutaraldehyde for 30 minutes.

The crosslinked membrane was washed with ethanol and then dried at 60° C. for 24 hours. The SWNT volume fractions of the resulting membranes were determined from the mass fractions and densities of SWNTs and PVA. Membranes with SWNT volume fractions of 0.11, 0.21, 0.31, and 0.42 are referred to as pwd-1, pwd-2, pwd-3, pwd-4, respectively in the following discussion. These membranes have thicknesses in the range of 40-100 µm, as determined by a screw gauge as well as cross-sectional SEM images.

Preparing Composites Using SWNT Gel

SWNT gels (8 mL, 16 mL, 24 mL, and 32 mL) made by the first method described herein were mixed at room temperature with 20 mL of PVA aqueous solutions containing 360 mg, 320 mg, 280 mg, and 240 mg of PVA respectively. The PVA/SWNT composite membranes were then cast and crosslinked by the same procedures mentioned in the previous section. The SWNT mass fractions in the resulting PVA/SWNT membranes were determined by thermogravimetric analysis. The SWNT volume fractions were determined as mentioned above. Membranes with SWNT volume fractions of 0.08, 0.20, 0.33, and 0.38 are referred as gel-1, gel-2, gel-3, and gel-4 respectively in the following discussion. These membranes had thicknesses in the range of 40-100 µm, as determined by a screw gauge as well as cross-sectional SEM images.

Preparing Different Composites Using SWNT Gel

In order to show that the method has general applicability, similar experiments will be done, beginning with cellulose acetate, to confirm that the method would work with other polymers and/or SWNTs. No extensive characterizations are yet available, but we expect that preliminary work will confirm that the method has general applicability.

Measurement Methods

Electron Microscopy and Energy Dispersive Spectroscopy (EDS):

The morphology of the SWNT/PVA composite membranes was imaged with a scanning electron microscope (SEM, Hitachi S-3700N). In order to observe the cross-sectional morphology, the membranes were cryogenically fractured in liquid nitrogen. Energy dispersive spectroscopy (EDS) analysis of the cross-sections was carried out with the same instrument. Transmission electron microscopy (TEM) was used to image the SWNTs dispersed in the polymeric matrix. A sample of the composite membrane was first embedded in epoxy and then microtomed into approximately 100-nm slices, which were collected on 300-mesh copper grids coated with Formvar layers. TEM images were recorded on a Hitachi HF2000 field emission TEM operated at 200 kV.

XRD Measurements and Simulations:

X-ray diffraction (XRD) scans in Bragg-Brentano geometry were performed on a PAnalytical X'pert Pro MPD diffractometer operating with a Cu Kα source. Diffraction data were collected with a collimator and Miniprop detector, in the range of 3-30° 2θ and a step size of 0.05°. Grazing-angle XRD scans were performed on PAnalytical X'pert Pro MRD diffractometer operating with a Cu Kα source. The diffraction patterns were recorded with a collimator and Miniprop detector scanning from 0-90° φ and a step size of 0.05°, at a fixed 2θ values off 4.6° and 19.5° in order to probe the orientation of SWNTs and PVA polymer chains respectively. XRD simulations were performed to investigate the extent of SWNT bundling. The Reflex module of the Materials Studio 3.2 molecular simulation package (Accelrys, Inc.) was used, and the details of such simulations have been reported in our previous works.[9]

SAXS Measurements and Simulations:

Small angle X-ray scattering (SAXS) on the prepared membranes were performed on the DND-CAT beamline at the Advanced Photon Source (Argonne National Laboratory). The beamline was tuned to operate at 17 keV, resulting in an X-ray wavelength of 0.73 Å. The beam at the sample position was controlled to have dimensions of a few hundred microns. The SAXS patterns of SWNT/PVA composite membranes were simulated as described in the Results and Discussion section, and key structural parameters were obtained by fitting the model predictions to the measured data.

Pervaporation:

The composite membranes were used for pervaporation of an ethanol/water mixture. The feed solution was 80 wt % ethanol. The measurements were performed at 60° C., with a feed and permeate pressure of 101 kPa and 0.5 kPa respectively. Two cold traps at 77 K were used to collect the permeate. After 2 hours of permeation, the cold traps were weighed in order to obtain the total permeate mass flow rate. The total mass flux was determined by dividing the mass flow rate by the membrane area (18.8 cm$^2$). The permeate composition was measured by a gas chromatograph (GC). The water and ethanol molar fluxes (J) thus obtained were converted into water and ethanol permeability by:

$$J = \frac{P_{eff}}{t} \Delta p \quad (1)$$

where $P_{eff}$ is the effective permeability of the membrane for the transported molecules, t is the thickness of the membrane, and $\Delta p$ is the vapor pressure difference of the transported molecules between the feed side and the permeate side. The thicknesses of the membranes were measured by a spring thickness gauge. In order to obtain $\Delta p$, the vapor pressures of water and ethanol on the feed side and on the permeate side were determined separately. The water or ethanol vapor pressures on the feed side were taken as the product of its liquid phase mole fraction, its saturated vapor pressure, and its activity coefficient for the mixture. The liquid phase mole fraction was measured by GC. The saturated vapor pressures and the activity coefficient were estimated by the Antoine equation and the UNIFAC model, respectively. The water or ethanol vapor pressures on the permeate side were the product of the measured pressure on the permeate side and its mole fraction on the permeate side measured by GC.

Molecular Adsorption and Diffusion Simulations:

The construction and the structural optimization of SWNT atomic models is described in our previous works.[6-8] Adsorption isotherms were calculated at 333 K for single-component water and ethanol using the Grand Canonical Monte Carlo (GCMC) method as implemented in the MUSIC simulation code, with the molecules only allowed to be inserted within the NT pore. The CLAYFF force field for NTs, the SPC model for water, and the TraPPE force field for ethanol were used as explained in references 6-8 and 10, which are incorporated by reference in their entirety, and will not be repeated here. The flexibility of hydroxyl groups has been described in the art, with all atoms in the NTs being fixed in position except for the surface hydroxyl groups.

To examine the diffusion of water and ethanol in NTs, NVT molecular dynamics (MD) simulations at 333 K were performed using a Nose-Hoover thermostat. Unlike our GCMC calculations, all atoms in the NTs were allowed to move in the MD calculations. After equilibrating the system for 0.4 ns, MD simulations were run for 2 ns with a time step of 1 fs. The corrected diffusivities ($D_0$), which describe the diffusive motion of the center-of-mass of the molecules relative to the reference frame of the adsorbent, were calculated by averaging data over 30 independent trajectories for water and ethanol loadings ranging from near-zero to near-saturation loading.

Transport diffusivities ($D_t$), which describe the macroscopic diffusive transport under the influence of a concentration gradient, were then calculated from $D_0$ and the thermodynamic correction factor: $D_t = D_0 \partial \ln f / \partial \ln C$. Here, f is the fugacity of the bulk gas phase in equilibrium with the concentration C of the species in the adsorbed phase. The thermodynamic correction factor $\partial \ln f / \partial \ln C$ was obtained from the computed adsorption isotherms by assuming fugacity and pressure to be equal in the pressure range considered in this study. The permeability (P) at a given pressure (p) is taken as $P = D_t(C)C/p$, where C is the concentration of species in the adsorbed phase at the given pressure. The permeability information for the pressure range of the pervaporation experiments (p=101 kPa for the feed side and p=0.5 kPa for the permeate side) was thus obtained.

Solid-State NMR:

$^1$H and $^1$H→$^{13}$C cross-polarization (CP) solid-state NMR measurements were performed on a Bruker DSX 400 spectrometer operating at resonance frequencies of 399.8 MHz for $^1$H and 100.5 MHz for $^{13}$C. The membranes were cut into small pieces and packed tightly into a 4 mm rotor. The rotor was spun at frequency of 10 kHz during the measurements. A π/2 pulse and 4 s repetition time were applied for both $^1$H and $^{13}$C measurements. Chemical shifts of the $^1$H and $^{13}$C spectra were referenced to adamantane.

Uniformity of Composites

Figure 2:
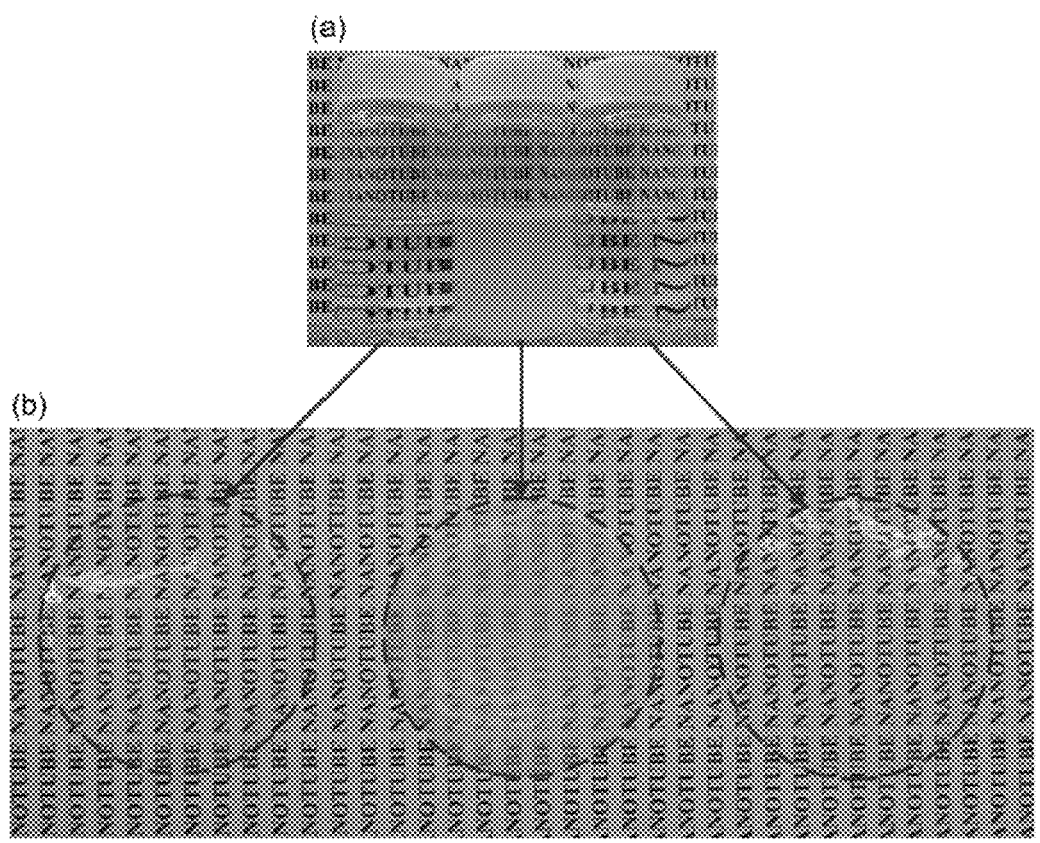
FIG. 2. Photographs of (a) aqueous solutions of pure PVA, SWNT powder and SWNT gel from left to right; (b) a pure PVA membrane, a powder-derived SWNT/PVA membrane having around 40 vol % of SWNT, and a gel-derived SWNT/PVA membrane having around 40 vol % of SWNT, from left to right.

Photographs of the aqueous PVA/SWNT solutions and PVA/SWNT membranes prepared by the two different starting materials (SWNT gels and SWNT powders) are summarized in FIG. 2. The pure PVA solution, and the solution used for preparing the gel-4 membrane, both show high transparency in comparison to the PVA/SWNT solution used for preparing the pwd-4 membrane (FIG. 2a). This suggests that the SWNTs in gel-4 solution disperse as nanostructures with dimensions smaller than the wavelength of visible light (390 nm). On the other hand, suspended particles can be visually observed in the pwd-4 solution, which implies that the SWNT particles do not completely re-disperse into individual SWNTs in a pure aqueous solution with no pH adjustment.

As seen from FIG. 2b, the membrane made from the gel-4 solution shows transparency similar to pure PVA membranes, thereby indicating the absence of phase separation during membrane formation and good dispersion of the SWNTs in the solid phase. In contrast, the low transparency of the pwd-4 membrane implies the aggregation of SWNT particles in the membrane.

Figure 3:
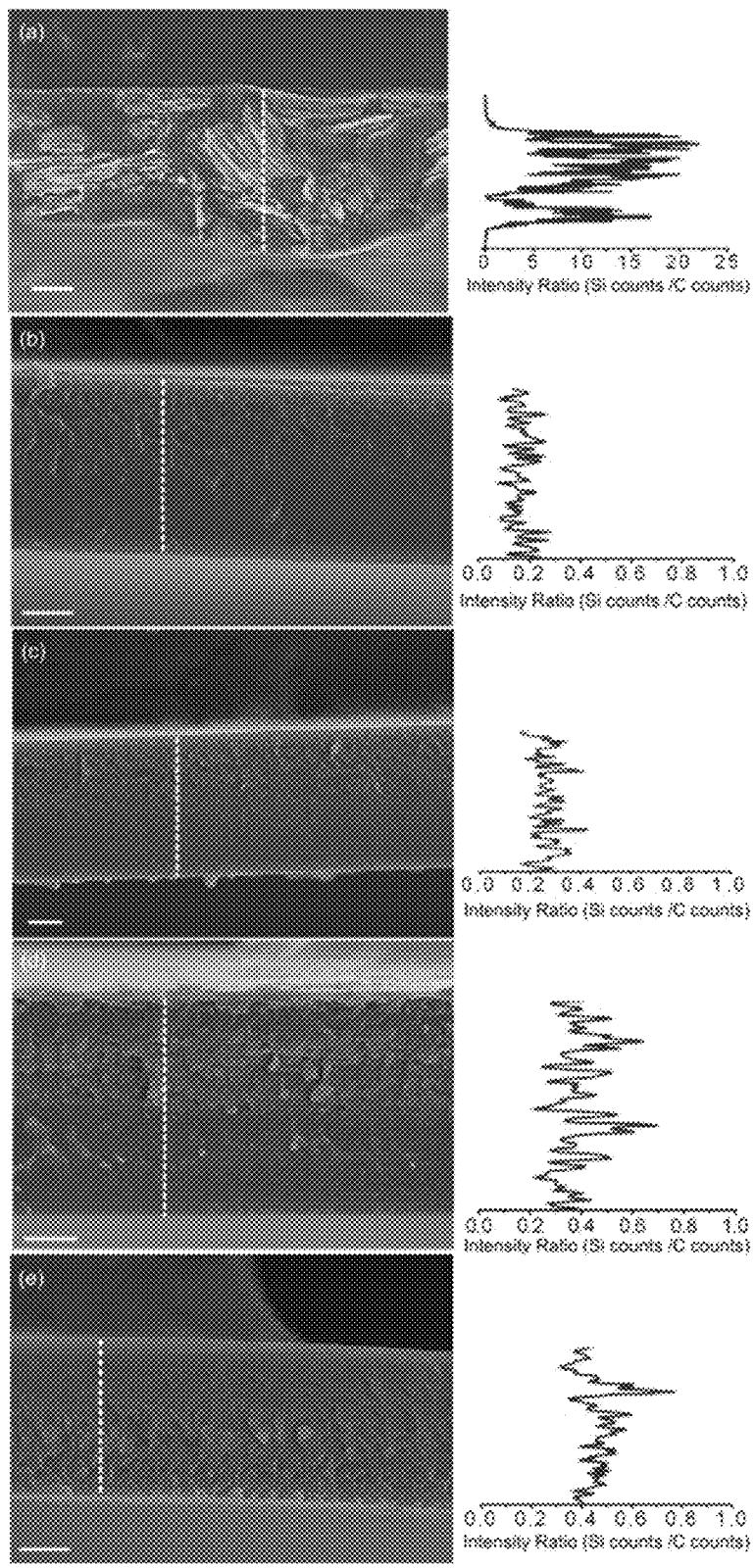
FIG. 3. SEM images (left) and line profiles of silicon/carbon intensity from EDS patterns (right) for SWNT/PVA membranes prepared by SWNT powders or gels: (a) pwd-4, (b) gel-1, (c) gel-2, (d) gel-3, and (e) gel-4. The vertical dashed line represent the locations where EDS line profiles were measured.

FIG. 3 shows cross-sectional SEM images and EDS line profiles of the silicon-to-carbon intensity ratio for membranes prepared from SWNT powder (pwd-4) and SWNT gel (gel-4). Similar results are obtained for the remaining membranes in our sample set. The pwd-4 membrane (FIG. 3a) displays the existence of large SWNT agglomerations that have a high silicon-to-carbon intensity ratio in EDS. However, although the SWNT aggregates do not completely dissociate during membrane formation, the absence of large voids between the SWNTs and the PVA matrix suggests good adhesion properties between the two materials. This is likely due to the interaction of the hydroxyl groups of PVA with the bridging hydroxyl groups on the outer surface of the SWNTs.

Membranes prepared with SWNT gels exhibit a homogeneous appearance in the cross-sectional SEM image and the EDS profile (FIG. 3b-e), thereby suggesting that the SWNTs are uniformly dispersed. Additionally, a monotonic increase of the silicon-to-carbon ratio is observed in the SWNT gel membranes upon increasing the SWNT volume fraction (FIG. 3b and Table 4). The mean and standard deviation of the silicon-to-carbon ratio are summarized in Table 5 with a spatial resolution of 0.1 μm. The membranes prepared using SWNT gels yield much more uniform SWNT dispersion than those prepared by SWNT powders.

Bundling and Orientation

Solid-state X-ray diffraction and scattering are excellent probes of SWNT bundling, orientation, dimensions and dispersion in a solid medium. X-ray diffraction (XRD) with respect to the Bragg angle 2θ can be used for assessing the bundling of SWNTs, grazing angle X-ray diffraction with respect to the azimuthal angle φ can be used to investigate the SWNT orientation, and small-angle X-ray scattering (SAXS) can quantitatively elucidate the dimensions and dispersion of SWNTs in the composite membranes.

The diffraction patterns of nanotubes forming small bundles are not dominated by Bragg diffraction, but by X-ray scattering. In contrast to ordered porous materials such as one-dimensional zeolites, MCM-41, or SBA-15, the small bundles (e.g., bundles with fewer than 25 individual nanotubes) in nanotube materials do not provide sufficient long-range periodicity for Bragg diffraction. Hence, an explicit atomic-scale simulation of X-ray scattering from a finite-size bundle is a more reliable tool for predicting the XRD patterns.

Figure 4:
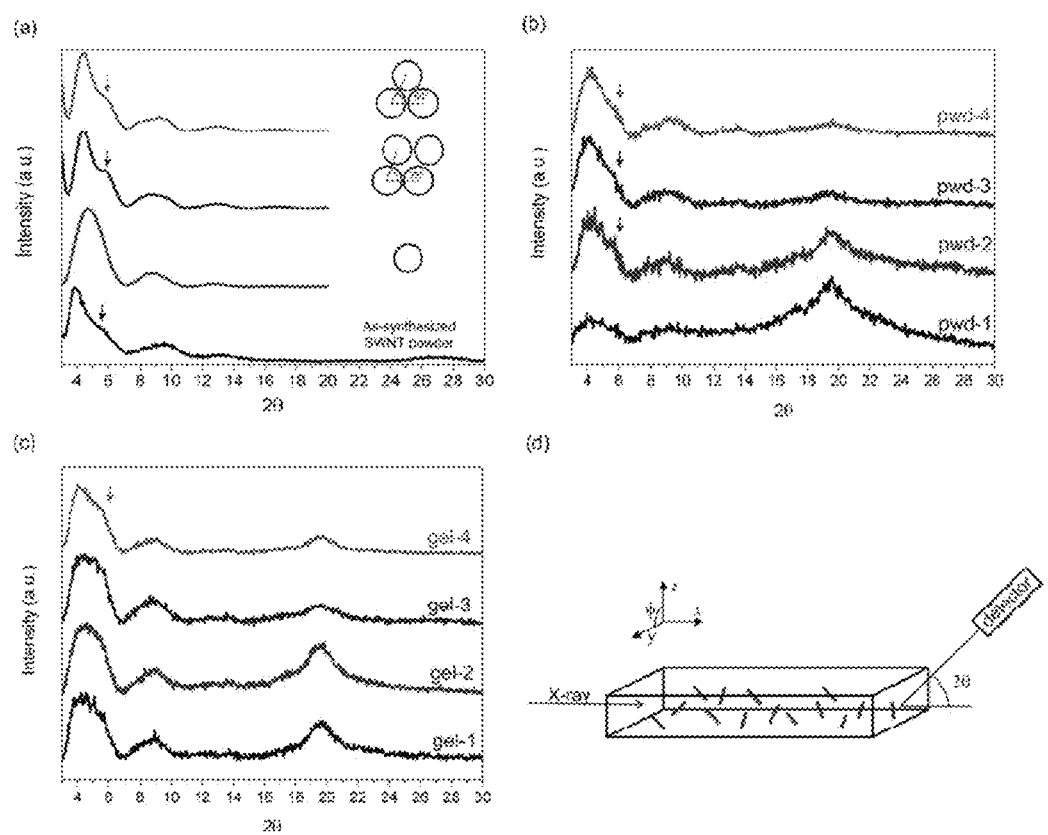
FIG. 4. (a) Experimental SWNT XRD pattern (bottom), and simulated XRD patterns of isolated SWNTs and SWNT bundles with different bundling arrangements. The arrows indicate the shoulder peak distinctive to bundle formation. (b) XRD patterns for SWNT/PVA membranes prepared from SWNT powders. (c) XRD patterns for PVA/SWNT membranes prepared from SWNT gels. The arrows in (a)-(c) point out the "shoulder" in the patterns. (d) Schematic diagram of the XRD measurement with respect to angle φ. The short rods represent SWNTs dispersed in the composite membrane with different orientations.

Such simulations have been previously carried out for the aluminosilicate SWNTs and have elucidated their bundling characteristics in powder form. (See reference 9) FIG. 4(a) summarizes experimental XRD patterns from SWNT powder samples and simulated patterns from different bundling arrangements. The simulated patterns indicate a shoulder at 5-6° 2θ as being the main difference between isolated SWNTs and bundled SWNTs. Considering the presence of this peak at 5-6° 2θ in the XRD pattern of as-synthesized SWNT powder sample, it has been concluded that the SWNTs in the powder samples are not individually dispersed but instead form small 2×2 or triangular bundles. Simulated XRD patterns of SWNTs with various bundling arrangements (3×3, 4×4, etc.) were also reported in our previous work.

The XRD patterns of PVA/SWNT membranes prepared from powder samples (FIG. 4b) show clear shoulder peaks for pwd-2, pwd-3, and pwd-4, indicating that the SWNT powers do not fully redisperse into individual SWNTs in the composite membranes. This observation is consistent with the SEM images, where SWNT agglomerated particles are observed in the PVA matrix. The shoulder peak in the pwd-1 sample is more difficult to observe due to the low signal-to-noise ratio of the nanotube scattering intensity at low volume fractions. The sharp peak at 19.5° 2θ in all the membrane samples is due to the crystallinity of PVA polymer chains, and is also observed in pure PVA membranes (not shown).

Composite membranes prepared using SWNT gel samples (gel-1, gel-2, and gel-3) show the absence of the shoulder peak at 5-6° 2θ (FIG. 4c), providing positive evidence that the SWNTs disperse in the PVA matrix as isolated SWNTs. The PVA chains may effectively penetrate the loosely coordinated network of SWNT-water bonds existing in the gel, but are not likely able to penetrate the interstices between SWNTs in the powder. In other words, the methodology of preparing PVA/SWNT composites starting from SWNT gels overcomes the problem of obtaining individually dispersed SWNTs in a polymer matrix with high loadings (>20 vol %).

While 2θ XRD reveals the bundling of SWNTs, "rocking-curve" (φ angle) XRD measurements elucidate the degree of out-of-plane orientation of the SWNTs as well as the PVA chains in the composite membranes. The schematic experimental set-up is illustrated in FIG. 4d. The degree of orientation can be obtained by measuring the intensity of a specifically selected XRD peak (i.e., constant 2θ) with the sample tilted at various angles φ=0 to 90°, and then calculating Herman's orientation parameter ($f_H$):[72-75]

$$f_H = \frac{3\langle\cos^2\phi\rangle - 1}{2} \quad (2)$$

where $$\langle\cos^2\phi\rangle = \frac{\int_0^{\frac{\pi}{2}} I(\phi)\cos^2\phi\sin\phi\,d\phi}{\int_0^{\frac{\pi}{2}} I(\phi)\sin\phi\,d\phi} \quad (3)$$

and I(φ) is the measured intensity as a function of the azimuthal angle φ. $f_H$=1 represents perfect out-of-plane alignment whereas $f_H$=−0.5 indicates perfect in-plane alignment. For a perfectly random distribution of orientations, $f_H$=0. Typically, $f_H$ values higher than 0.8 imply a high degree of out-of-plane orientation along the z-axis. For each PVA/SWNT composite membrane sample, φ angle scans were conducted at 2θ=4.6° and 19.5° for assessing the orientation of the SWNTs and the PVA chains respectively. The raw diffraction patterns are not presented herein, but the $f_H$ values are summarized in Table 1. In general, the values of $f_H$ for 2θ=4.6° are close to zero, suggesting that the SWNTs are almost randomly oriented in the membranes prepared from SWNT gels as well as powders. The values of $f_H$ for 2θ=19.5° are appreciably higher than zero, and indicate a weak preferred out-of-plane orientation of the PVA chains. These orientation distributions of the SWNTs and PVA chains are likely due to the absence of a strong external aligning force, such as an applied magnetic field that has been used for aligning carbon nanotubes.

Small angle X-ray scattering (SAXS) can be used to assess the distribution of intertubular distances between SWNTs in the polymeric matrix. The transformation from the momentum transfer (Q) domain into the spatial distance (d) domain for SAXS data from well-dispersed cylindrical particles, has been derived by Glatter:

$$g(d) = \frac{1}{(2\pi)^2} \int_0^\infty I(Q) \cdot Q \cdot d \cdot \sin(Q \cdot d) \cdot \exp(-D \cdot Q^2) \, dQ \tag{4}$$

Here, d is the inter-tubular distance, g(d) is the distribution function of the inter-tubular distance, Q is the X-ray momentum transfer, I(Q) is the scattering intensity, and $\exp(-DQ^2)$ is added to remove the "termination effect" of the transformation. Generally, the parameter D is of the same order of magnitude as $1/Q^2$, and its value is taken as 500 Å$^2$ for calculation of all the distance distribution transformations reported in this paper.

Figure 5:
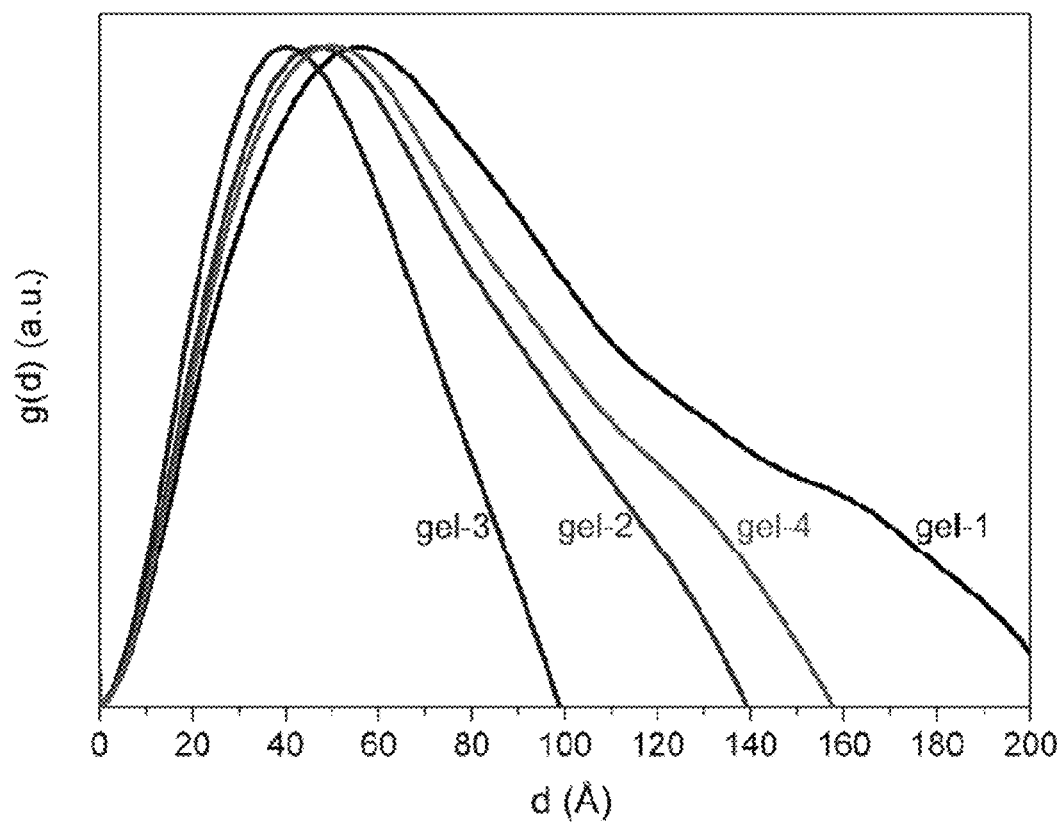
FIG. 5. The inter-tubular distance distribution, derived from SAXS data, of SWNTs dispersed in PVA/SWNT composite membranes prepared by SWNT gels.

The intertubular distance distribution functions, g(d), for PVA/SWNT membranes prepared from SWNT gels are summarized in FIG. 5. Generally, the most likely intertubular distance and the width of the distance distribution both decrease, as expected, when the SWNT volume fraction increases from 7.6% (gel-1) to 19% (gel-3). However, at higher volume fractions of 37% (gel-4), the distribution width and the most likely intertubular distance increases, perhaps due to the onset of bundle formation in the gel-4 sample as suggested by the XRD data. The most likely intertubular distance as read from FIG. 5 is compared to the theoretical average intertubular distance between dispersed SWNTs at a given volume fraction in Table 2. The two quantities are in close agreement for samples gel-1, gel-2, and gel-3, suggesting that the SWNTs in these membranes are uniformly distributed as individual nanotubes in the PVA matrix. On the other hand, the theoretical intertubular distance for the gel-4 sample is much smaller than the distance deduced from SAXS data, suggesting that the intertubular distance distribution for gel-4 is influenced by the formation of SWNT bundles instead of individually dispersed SWNTs.

Figure 6:
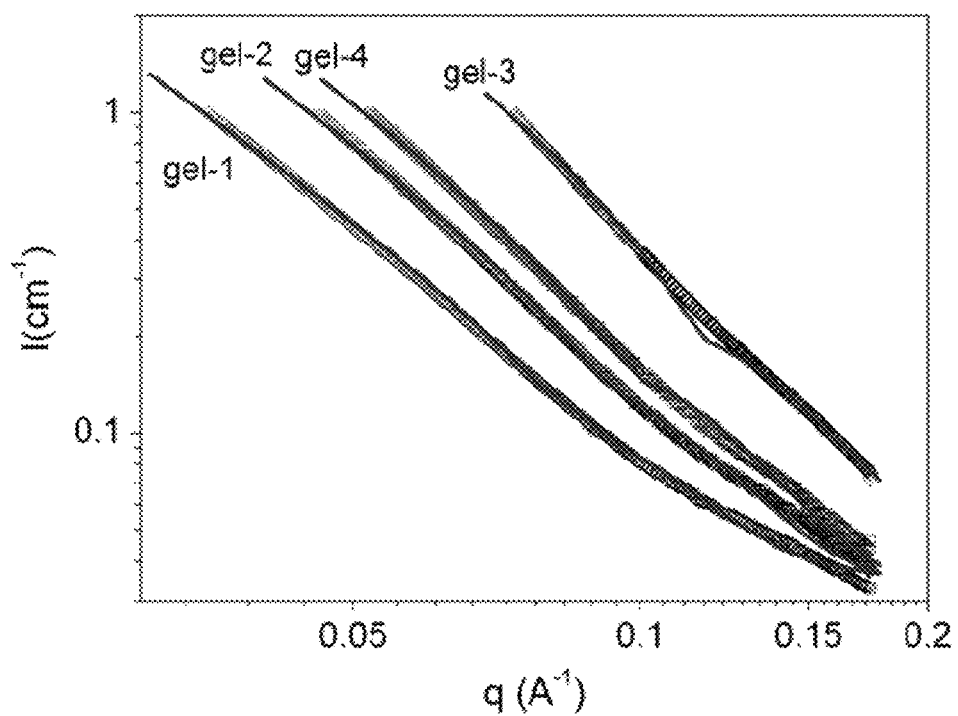
FIG. 6. SAXS data (black symbols) and model fits (black solid curves) for PVA/SWNT membranes prepared from SWNT gels.

The SAXS data can be fitted to yield information on the dimensions of SWNTs. The scattering intensity can be written as:

$$I/(Q) = A \cdot F(Q) \cdot S(Q) + B \tag{5}$$

where F is the form factor, S is the structure factor, and A and B are the instrumental constants. For cylindrical particles, the form factor is:

$$F(Q) = \int_0^{\frac{\pi}{2}} \left[ \frac{2J_1(Q \cdot r_o \cdot \sin\beta)}{Q \cdot r_o \cdot \sin\beta} \frac{\sin(0.5 \cdot Q \cdot L \cdot \cos\beta)}{0.5 \cdot Q \cdot L \cdot \cos\beta} \right]^2 \sin\beta \, d\beta \tag{6}$$

where $J_1$ is the first-order Bessel function of the first kind, $r_o$ is the outer radius of the cylinder, L is the length of the cylinder, and β is the angle between the scattering vector and the long axis of the cylinder. The structure factor for homogeneously dispersed cylindrical objects is:

$$S(Q) = 1 - \pi \left( \frac{2J_1(Q \cdot d)}{Q \cdot d} \right) \tag{7}$$

where d is the intertubular distance, as obtained from the maximum of the intertubular distance distribution function (FIG. 5). The data for Q>0.06 Å$^{-1}$ are fitted by Equations 5-7, whereas the region Q<0.06 Å$^{-1}$ is fitted by the Guinier relation (I(Q)~Q$^{-2}$). The SAXS data and fits are presented in FIG. 6, and the fitted parameters (SWNT length and outer diameter) for different samples are summarized in Table 2. The SWNT dimensions from SAXS data fitting are in excellent agreement with the dimensions of individual SWNTs obtained in previous reports using a variety of techniques.

Separation by PVA/SWNT Composites

Recent computational studies suggest that the aluminosilicate SWNTs allow a high water diffusivity ($10^{-5}$-$10^{-4}$ cm$^2$/s) that is one to two orders of magnitude higher than in other microporous materials such as zeolites, and also a high adsorptive water selectivity over alcohols (greater than 50 for a 1:9 water:methanol mixture). PVA also has high water selectivity over organics, and is the dominant polymeric material used in pervaporation membranes that dehydrate organic/water mixtures for applications such as bioethanol production. We hypothesize that PVA/SWNT composite membranes could allow higher throughput in such applications (due to the high permeability of water in PVA) while maintaining a high selectivity over organic molecules. In this section, we investigate this hypothesis by a combination of experimental pervaporation measurements, transport modeling, and molecular simulations.

The permeation properties of PVA/SWNT composite membranes prepared from SWNT powders and SWNT gels were measured by pervaporation at 60° C. with an 80 wt % ethanol feed solution. The results are summarized in FIG. 7 as a function of the SWNT volume fraction ($\Phi_f$). Membranes prepared from SWNT gels show a monotonic water permeability with increased SWNT volume fraction. The water permeability of membranes prepared with SWNT powders show no significant improvement at lower volume fractions, but the permeabilities increase abruptly after $\Phi_f$=0.2.

Figure 7:
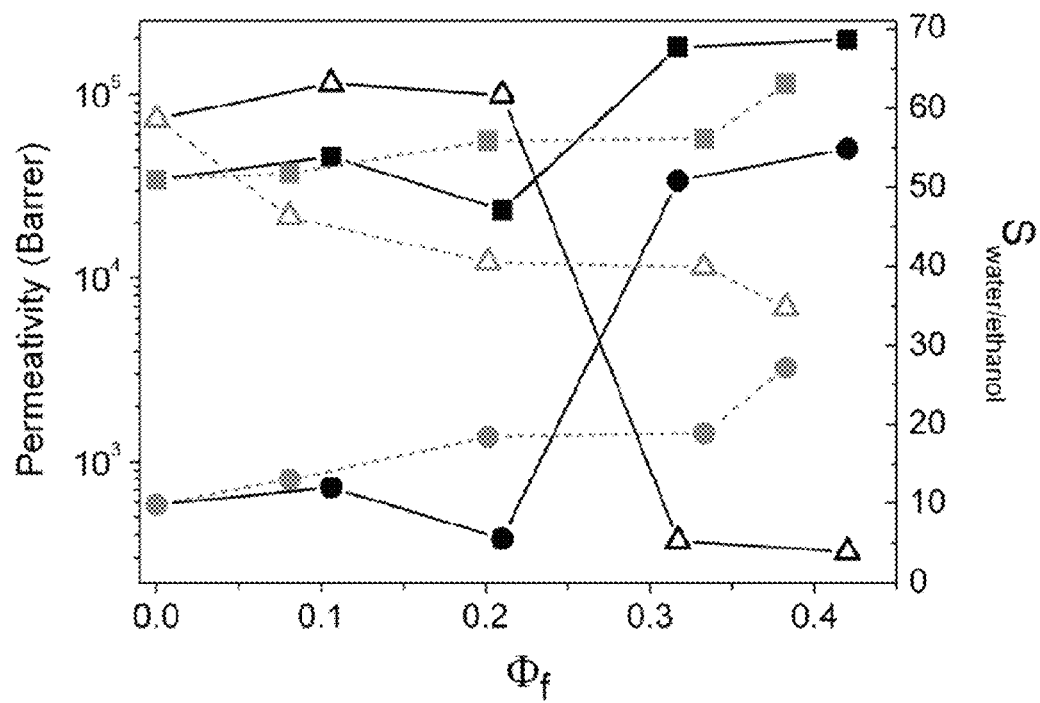
FIG. 7. The water (solid squares) and ethanol (solid circles) permeability, and the water/ethanol selectivity (open triangles), of PVA/SWNT membranes prepared from SWNT powder (black solid lines) and SWNT gel (gray dashed lines) with different SWNT volume fractions.

Similar trends are found for the ethanol permeability. The intrinsic membrane selectivity ($S_{water/ethanol}$) is defined as the ratio of the water and ethanol permeabilities, and the values are shown in FIG. 7. Membranes prepared from SWNT gels show a monotonic decrease in selectivity from 58 (pure PVA) to 35 ($\Phi_f$=0.4). Membranes prepared from SWNT powders show no change in selectivity at low SWNT volume fractions, but the selectivity drops dramatically to below 5 at higher volume fractions. These results indicate that the properties of membranes made from aggregated SWNT powders are likely affected by the occurrence of defects such as interfacial voids. Therefore, the following discussion focuses only on the composite membranes made from SWNT gels.

Figure 8:
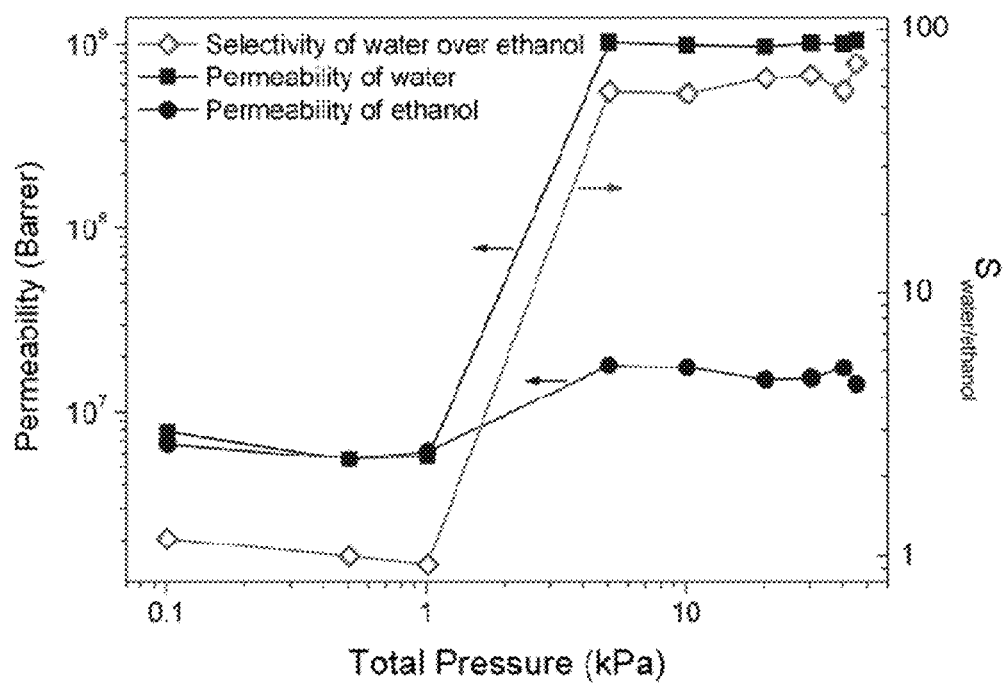
FIG. 8. Predicted water and ethanol permeabilities, and water/ethanol selectivity, of the SWNT at different pressures as obtained from grand canonical Monte Carlo and molecular dynamics simulations.

To gain more insight into the above membrane properties, we computationally estimated the expected water/ethanol separation performance of the SWNT at our operating conditions, and coupled this information with our recently developed model for estimating the permeability of composite membranes with tubular fillers. FIG. 8 shows the predicted permeabilities of water and ethanol, and $S_{water/ethanol}$, of the aluminosilicate SWNT in the pressure region relevant to the pervaporation measurements (0.1-45 kPa), as obtained from molecular simulations of adsorption and diffusion (as described in the Methods sections).

At higher total pressures (greater than 1 kPa), the SWNT shows excellent water permeability (four orders of magnitude higher than that of PVA). At low total pressure (below 1 kPa), the SWNT has significantly diminished permeability, which is nevertheless two orders of magnitude higher than that of PVA. The ethanol permeability of the SWNT does not exhibit strong pressure dependence, and is approximately two orders of magnitude higher than that of PVA. As a consequence, the SWNT is estimated to have a high intrinsic $S_{water/ethanol}$ of 55-75 at higher pressures, but a $S_{water/ethanol}$ of approximately unity at low pressures.

Our molecular simulations provide clear mechanistic insight into this phenomenon. At low pressure, both water and ethanol transport are dominated by the strong surface interactions between these molecules and the hydroxyl groups lining the SWNT wall. Strong hydrogen bonding leads to relatively slow surface diffusion of both molecules. At higher pressures, water fills the SWNT pore to a much greater extent than ethanol, forming multilayers in the SWNT channel and exhibiting almost bulk-liquid-like diffusive behavior. The predicted high selectivity in this regime is mainly driven by strong preferential filling of water in the SWNTs and not by diffusivity differences.

Using the above information on the permeability of the SWNT, we interpret the experimental pervaporation results with a macroscopic transport model. The "Kang-Jones-Nair (KJN)" model has been derived specifically for composite membranes with tubular fillers that possess perfectly anisotropic 1D transport properties. For a fixed tubular filler orientation, the KJN model predicts the effective permeability ($P_{eff}$) of the composite membrane as a function of the filler volume fraction ($\Phi_f$):

$$\frac{P_{eff}}{P_m} = \left(\left(1 - \frac{\cos\theta}{\cos\theta + \frac{1}{\alpha}\cdot\sin\theta}\Phi_f\right) + \frac{P_{eff}}{P_m}\left(\frac{1}{\cos\theta + \frac{1}{\alpha}\cdot\sin\theta}\right)\Phi_f\right)^{-1} \quad (8)$$

where $P_m$ and $P_f$ are the permeabilities of the matrix and the filler respectively, $\theta$ is the filler orientation with respect to the membrane transport direction, and $\alpha$ is the aspect ratio of the tubular filler (length divided by outer diameter). This relation extends to a composite membrane with a random distribution of filler orientations:

$$\frac{P_{eff}}{P_m} = \frac{\pi}{2}\cdot\left[\int_0^{\frac{\pi}{2}} \frac{P_m}{P_{eff,\theta}} d\theta\right]^{-1} \quad (9)$$

where $P_{m\,eff,\theta}$ is the permeability when the filler is aligned at an orientation $\theta$ (Equation 8). The KJN model somewhat underestimates the effective permeability and can be considered as a close lower bound, whereas the Hamilton-Crosser (HC) model for isotropic cylindrical fillers can be utilized as an upper bound for predicting the effective permeability of the composite membranes:

$$\frac{P_{eff}}{P_m} = \frac{P_f + 5P_m - 5(P_m - P_f)\Phi_f}{P_f + 5P_m + 5(P_m - P_f)\Phi_f} \quad (10)$$

Figure 9:
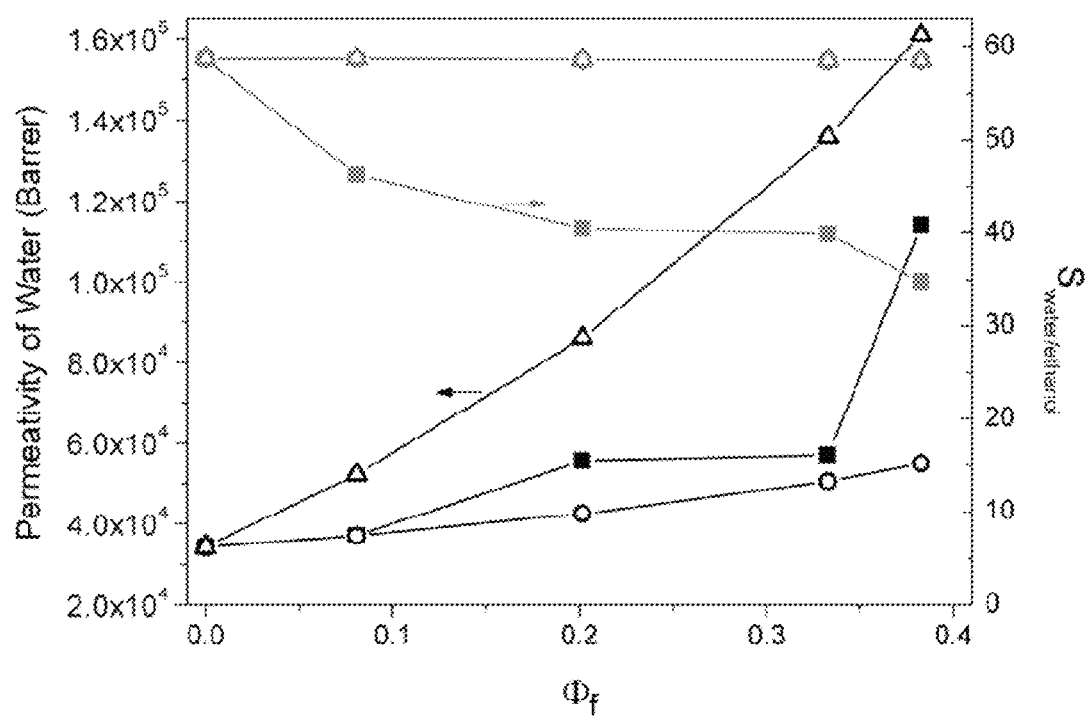
FIG. 9. Comparison of water permeability and water/ethanol selectivity obtained from pervaporation (a combination of membrane permeation and evaporation) experiments (solid squares), predictions of the KIN model (open circles), and predictions of the HC model (open triangles), for PVA/SWNT membranes prepared from SWNT gels.
Figure 10:
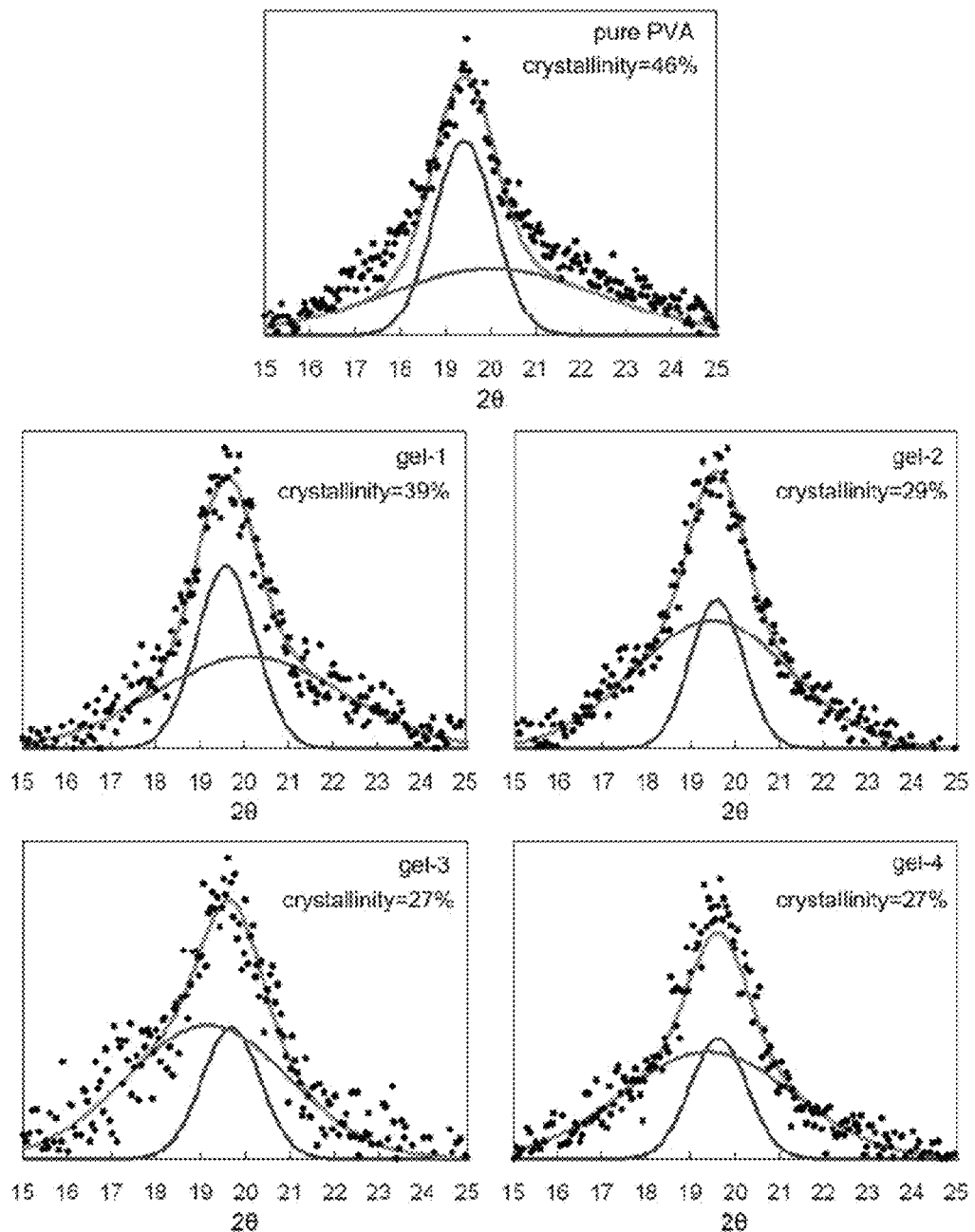
FIG. 10. XRD patterns highlighting the crystalline phase in the PVA matrix, for the pure PVA and the PVA/SWNT composite membranes. The black dots are raw experimental data. Each pattern is fitted by two Gaussian distributions, representing the crystalline phase (lowest curve) and the amorphous phase (middle curve) respectively. The top curves represent the summation of contributions from both the crystalline and the amorphous phases.

The model predictions are compared to experiment in FIG. 9. The experimentally measured water and ethanol permeabilities of PVA are used for the matrix ($P_{m,water}$=3.4×10$^4$ Barrer, $P_{m,ethanol}$=5.8×10$^2$ Barrer). The average water and ethanol permeability of the SWNTs (from FIG. 7) are $P_{f,water}$=5×10$^8$ Barrer and $P_{m,ethanol}$=1.1×10$^7$ Barrer. The aspect ratio is $\alpha$=217 (as derived from the SAXS analysis, Table 2), and the fillers are taken to have a random orientation distribution (as known from XRD data above).

Although the molecular simulations predict that the SWNT permeability varies by two orders of magnitude between low- and high-pressure conditions (FIG. 8), it was found that the membrane permeation model results are insensitive to the SWNT permeability because the SWNT permeability is at least two orders of magnitude greater than the permeability of the matrix (PVA) at all pressures. It is well known that the effective permeability of a composite membrane becomes insensitive to the filler permeability when it exceeds the matrix permeability by more than a factor of ~100. The KJN model predictions of the water permeability are in good agreement with the experimental results except at $\Phi_f$=0.4, whereas the HC model considerably overestimates the membrane permeability.

Both the KJN and HC models predict a higher water-over-ethanol selectivity than the experimental observations. Due to the high water selectivity of both PVA (experimentally known) and the SWNT (predicted by molecular simulation), the effective membrane selectivity in both models becomes insensitive to the SWNT volume fraction. A pronounced deviation of both permeability and selectivity from the KJN model prediction is observed at higher $\Phi_f$=0.4 for the membranes prepared from SWNT gels. On the other hand, the membranes pwd-1 and pwd-2 prepared from SWNT powders maintain the water permeability and water/ethanol selectivity at the expected level (similar to the pure PVA membrane).

These observations can be explained by several potential mechanisms, of which two appear to be most likely. Firstly, it is possible that the lower experimental value of the selectivity reflects an inaccuracy in the predictions of water selectivity in the SWNT. The permeability of ethanol during binary permeation along with water through the SWNT could be substantially different from the single component permeability.

A second possibility is the occurrence of changes in the microstructure and transport properties of the PVA matrix in the presence of large quantities of SWNT fillers and a large interfacial area between the PVA matrix and the outer surfaces of the SWNTs. For example, the molecular-scale structure of the PVA chains and the swelling behavior of PVA in the presence of water could be significantly altered by the presence of well-dispersed SWNT fillers. In the membranes made from SWNT gels, the average intertubular distance is in the range of 3.5-6 nm, so that there is nanoscale confinement of PVA in the spaces between the dispersed SWNTs. Furthermore, the nanotube-PVA interfacial area in these composites is relatively large (3.2×10$^{10}$-1.5×10$^{11}$ m$^2$/m$^3$ membrane volume). As a consequence, the water permeability and selectivity of the PVA matrix in the nanocomposite membranes could deviate substantially from those of the pure PVA membranes, due to altered molecular transport properties in the nano-confined PVA chains and near the PVA/SWNT interfaces.

The PVA/SWNT membranes prepared from SWNT powder samples display poor dispersion of the SWNTs in PVA and a much lower nanotube-PVA interfacial area than the PVA/SWNT membranes prepared from SWNT gel samples, and hence the polymeric matrix remains as a continuous phase with properties essentially identical to the pure PVA membrane. The pwd-1 and pwd-2 membranes therefore have fairly similar water/ethanol transport properties as the pure PVA membrane, since the microstructure of PVA does not change significantly and the incorporated SWNTs become "inactive fillers" due to their severe agglomeration. A detailed molecular-level study of the microstructure and dynamics of the nano-confined PVA matrix is presented below.

Crystallinity and Dynamics of PVA

The crystallinity of the PVA matrix with different SWNT loadings is determined from the XRD patterns shown in FIG.

10. The peak at 19.5° 2θ is assigned to the (10 1̄) reflection. This peak can be deconvoluted into two parts: a sharp crystalline domain and a broader amorphous component. The crystallinity of the PVA matrix is taken as the ratio of the diffraction intensity of the crystalline domain to the total intensity. For composite membranes prepared using the SWNT gels, the crystallinity monotonically decreases as the SWNT loading increases (from 46% for the pure PVA membrane to 27% for the composite incorporated with 38 vol % of SWNTs). The cause of the decrease in crystallinity is perhaps that the well-dispersed SWNTs interfere with the formation of hydrogen bonds between PVA polymer chains, impeding the formation of crystalline domains in the PVA matrix.

Figure 11:
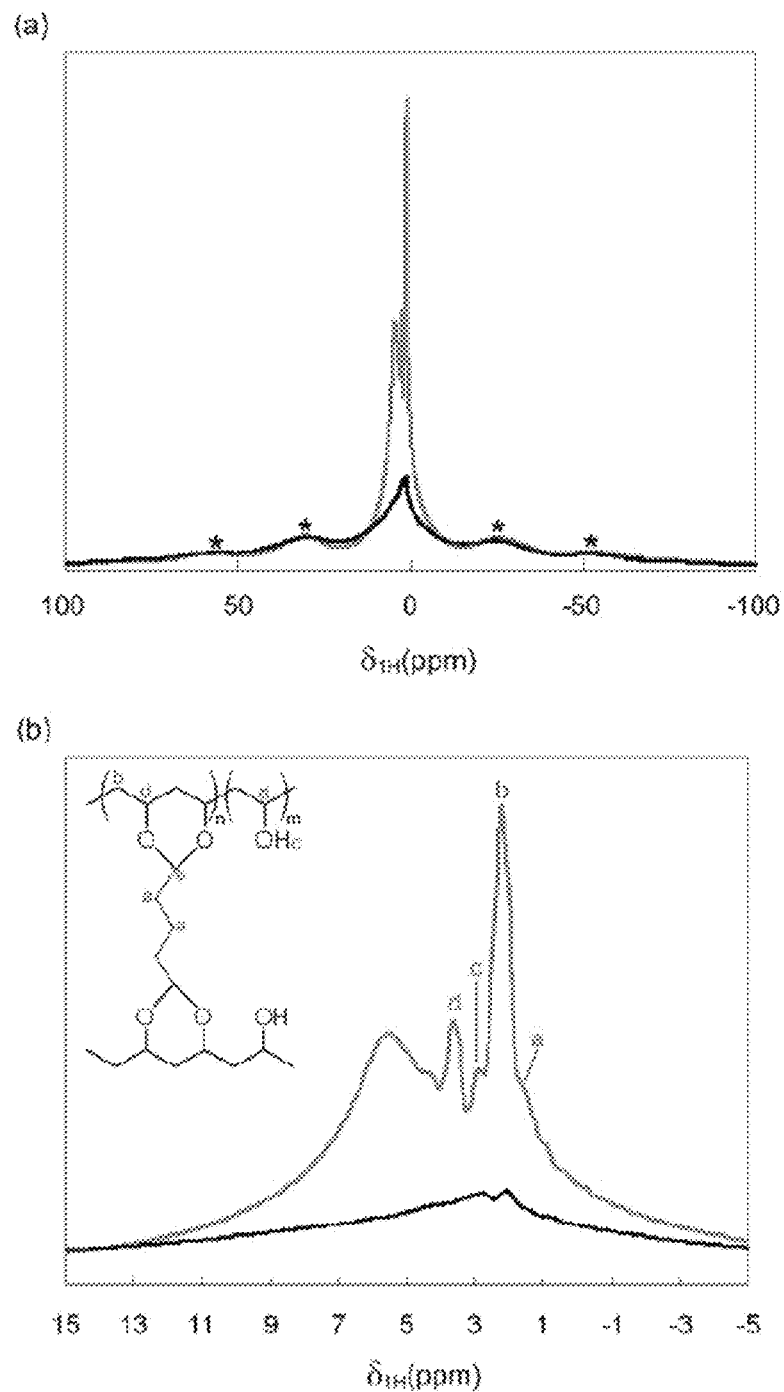
FIG. 11. (a) a large spectral region of the $^1$H spectra for the pure PVA (black) and the gel-4 (gray) samples. The asterisks (*) denote to the spinning side bands. (b) a narrower spectral region of the $^1$H spectra for the pure PVA (black) and the gel-4 (gray) sample.

While XRD investigates the crystallinity of the PVA matrix, solid-state NMR is an excellent tool for studying the polymer chain dynamics. Specifically, a higher relative intensity between the central band and the spinning side band in $^1$H NMR implies a higher proton concentration and mobility. Given approximately the same amounts of sample packed into the NMR rotor, the PVA/SWNT composite samples would possess a lower proton concentration from PVA than the pure PVA membrane. However, a much stronger central-band-to-spinning-side-band ratio is observed for the gel-4 sample in comparison to the pure PVA membrane (FIG. 11a).

This observation suggests that the protons from the PVA polymer chains in the gel-4 sample have significantly higher mobility than in the pure PVA sample. Faster proton dynamics implies a higher PVA chain mobility in the matrix phase of the gel-4 sample. Furthermore, the spectral resolution for the gel-4 sample is much higher than the pure PVA sample at very similar experimental conditions (FIG. 11b). Peak assignments for the area of 0-5 ppm are based upon a structure of the partially crosslinked PVA by glutaraldehyde. Peaks between 5-10 ppm in the spectrum for the gel-4 sample are contributed by protons from SWNTs. The proton denoted by "e" at 9-10 ppm in the partially crosslinked PVA structure, is not observed in the PVA/SWNT composite membrane, likely due to its low intensity in comparison to signals from the SWNTs in that region. Since the spectral resolution of $^1$H NMR can be enhanced by the proton mobility, the higher resolution seen in the gel-4 sample also supports its higher proton/PVA chain mobility in comparison to the pure PVA membrane. The observed higher PVA chain mobility for the PVA/SWNT composite membranes is in agreement with its lower crystallinity (determined by XRD), since amorphous polymer chains are expected to have faster dynamics than ordered crystalline polymers.

Figure 12:
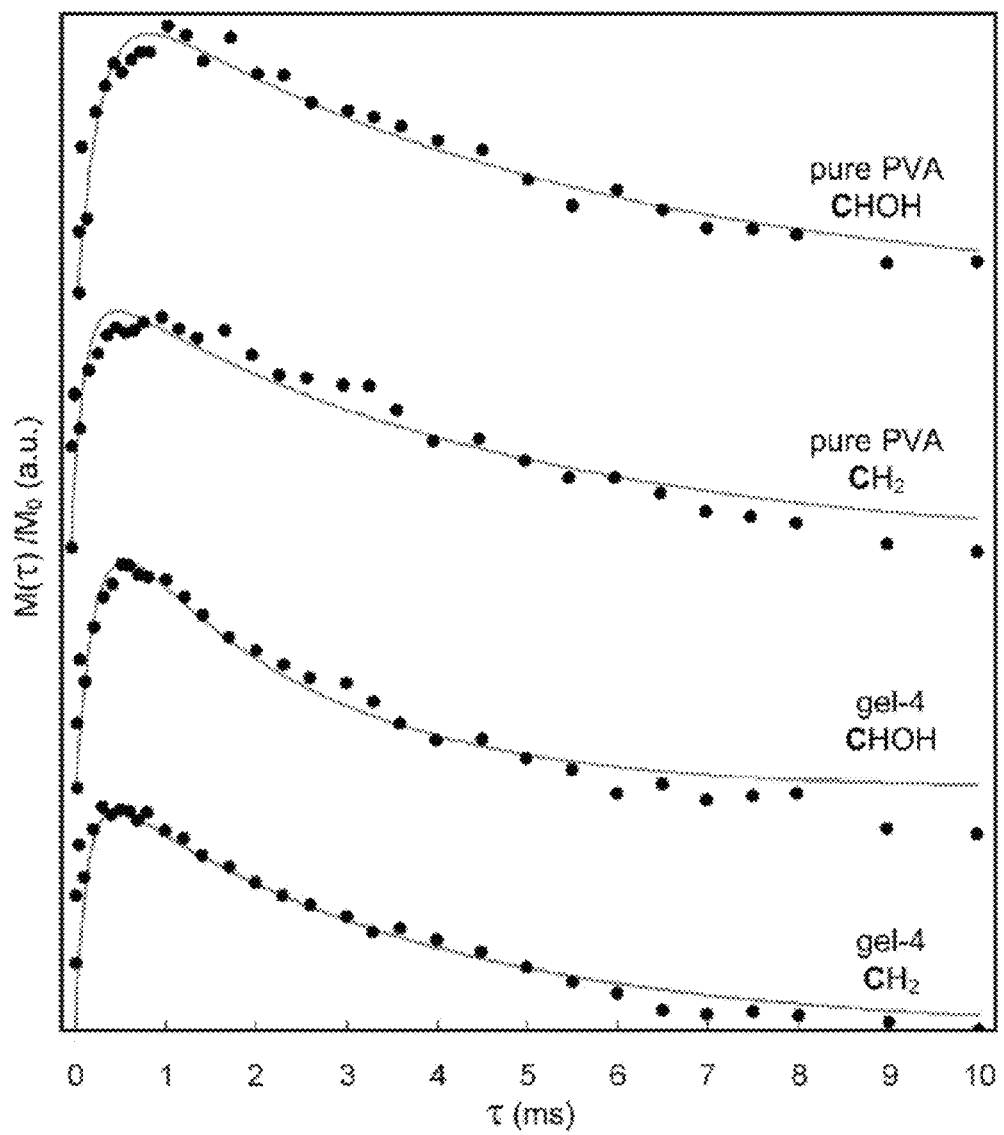
FIG. 12. The normalized peak intensity of two different carbons (CHOH and $CH_2$) in PVA versus the contact time for both the pure PVA and the samples made from gel-4. The black dots are the raw data and the gray curves are the fitted results.
Figure 13:
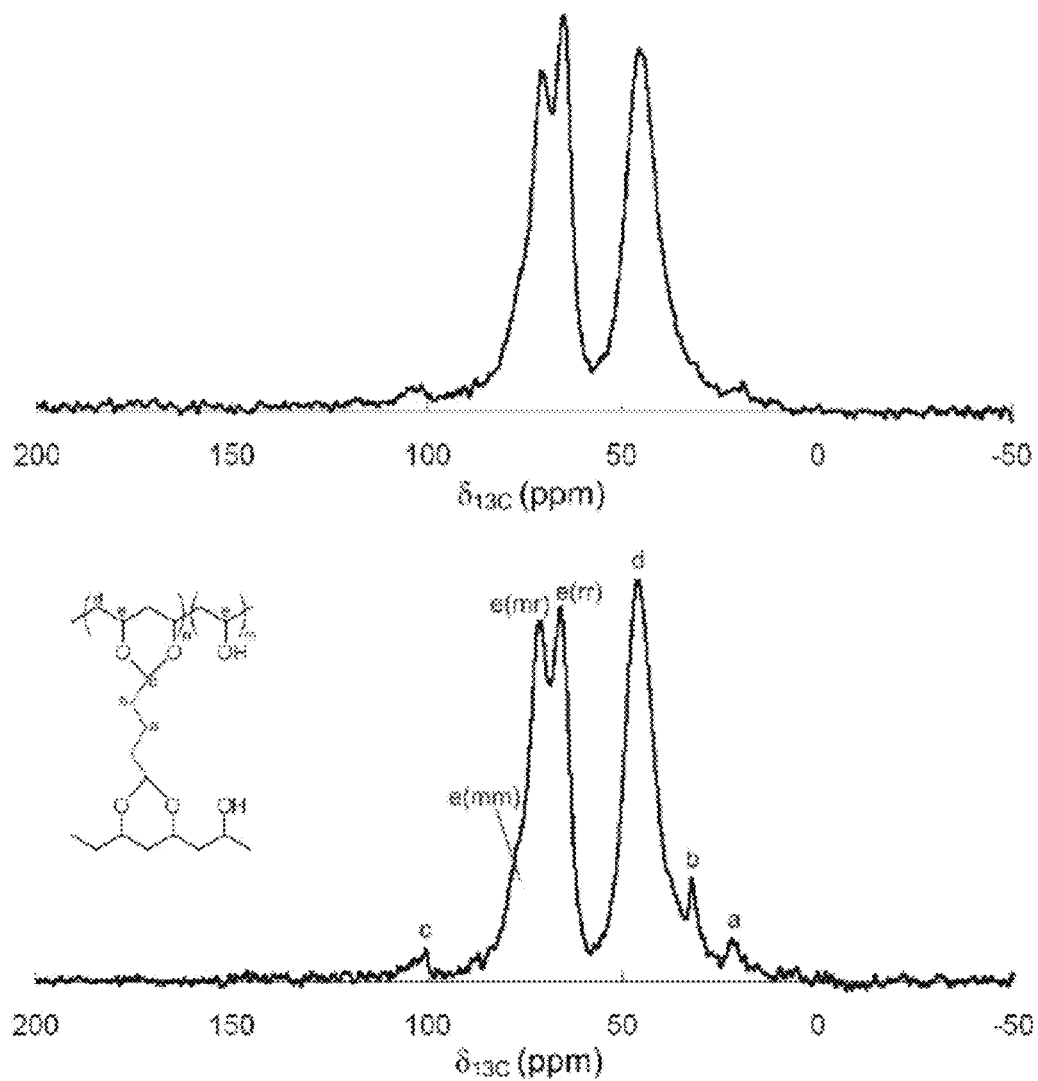
FIG. 13. Representative $^{13}$C CP/MAS NMR spectra for the pure PVA membrane (tope) and the gel-1 membrane (bottom) with 2 ms of contact time.

Additionally, as shown in FIG. 13, $^1$H→$^{13}$C cross-polarization (CP) measurements with a series of CP contact times (τ) were used to obtain microstructural and dynamical information on the PVA matrix. $^{13}$C CP-NMR spectra were recorded for the pure PVA and the gel-4 sample with various contact times. In the obtained spectra, there are two distinct peaks contributed by two different carbon atoms in PVA (CH$_2$ and CHOH). The peak at 45 ppm comes from CH$_2$ and the three adjacent peaks spanning from 60-80 ppm are contributed by CHOH with three different tacticities (from downfield to upfield: mm, mr, and rr). The intensity of the NMR signals for these two carbons is estimated respectively from the obtained spectra as a function of τ. The peak intensity from the raw $^{13}$C CP spectra, normalized by the maximum intensity among the series of measurements, is summarized in FIG. 12. Two time constants, $T_{1\rho}(^1H)$ and $T_{CH}$, can be derived by fitting the normalized peak intensity with the following equation:$_{99,100}$ $$\frac{M(\tau)}{M_0} = \left[\frac{e^{-\tau/T_{1\rho}(^1H)} - e^{-\tau/T_{CH}}}{1 - T_{CH}/T_{1\rho}(^1H)}\right] \quad (11)$$

where M(τ) is the intensity for a specific carbon in the $^{13}$C spectra at a given contact time and M$_0$ is the maximum peak intensity among the performed experimental series. The derived $T_{1\rho}(^1H)$ and $T_{CH}$ are summarized in Table 3.

For semi-crystalline materials (such as the prepared PVA/SWNT membranes), the amorphous phase acts as a relaxation sink. The constant $T_{1\rho}(^1H)$ for semi-crystalline materials represents the spin-diffusion time for the nuclear magnetization from the crystalline phase to the amorphous phase. The crystalline domain size, $\langle x \rangle$, can be correlated to $$T_{1\rho}(^1H) \text{ as } \langle x \rangle \sim (D_s \times T_{1\rho}(^1H))^{\frac{1}{2}}.$$

where D$_s$ is the spin-diffusion coefficient. The lower $T_{1\rho}(^1H)$ values of CH$_2$ and CHOH for the gel-4 sample in comparison to the pure PVA membrane, suggest that the SWNT-containing PVA matrix has a smaller crystalline domain size than pure PVA. On the other hand, the constant of $T_{CH}$ represents the characteristic time for polarization transfer from the protons to the carbon nuclei. The value of $T_{CH}$ is thus determined by both dynamical and structural effects: the mobility of the carbon adjacent to protons, and the proton concentration around the carbon. Specifically, a short $T_{CH}$ implies low carbon mobility or fewer protons in its immediate environment. However, similar $T_{CH}$ values are observed for the pure PVA and the gel-4 sample. Since our investigation suggests a higher polymer chain mobility for the gel-4 sample, the observation of similar $T_{CH}$ values is attributed to the fact that the carbons in the PVA/SWNT composite membranes have a larger number of adjacent protons, due to the presence of SWNTs with a dense coverage of hydroxyl groups on their outer surfaces.

We have demonstrated the fabrication and detailed characterization of nanocomposite membranes containing a high loading (up to 38 vol %) of aluminosilicate single-walled nanotubes (SWNTs) well dispersed in a PVA matrix. PVA/SWNT membranes prepared using SWNT gels were characterized by XRD (including rocking curve measurements), EDS, and SAXS measurements and analysis. These membranes show high uniformity, excellent dispersion of individual SWNTs (up to ~30 vol %), and the onset of bundle formation (3-4 SWNTs per bundle) at a SWNT loading of ~40 vol %. XRD rocking curve analysis indicates the SWNTs are randomly oriented in the membrane. Analysis of SAXS data reveals the SWNT dimensions and the intertubular distance distribution.

The transport properties of the PVA/SWNT membranes relevant to applications in the dehydration of ethanol/water mixtures, were investigated by pervaporation measurements, molecular simulation, and transport modeling. The membranes substantially enhance the water throughput with increasing SWNT volume fraction (up to 200% higher water permeability than pure PVA membranes at a SWNT loading of ~40 vol %), but led to a moderate reduction of the water/ethanol selectivity from 58 (pure PVA) to 35 (SWNT loading ~40 vol %). Detailed XRD and solid-state NMR studies suggest that the reduction of water/ethanol selectivity is likely due to the microstructural change of the PVA matrix with incorporation of SWNTs. Specifically, the crystallinity of the PVA matrix goes down (from 46% to 27% with 38 vol % of SWNT incorporated) and the mobility of PVA chains increases with the presence of SWNTs in the matrix. This study shows that it is possible to fabricate SWNT/polymer nanocomposite membranes with a high quality microstructure by inexpensive solution processing techniques, and gain insight into their permeation properties by a combination of experimental measurements and predictions by computational and theoretical methods.

TABLE 1

Orientation parameter ($f_H$) for PVA/SWNT composite membranes.

|  | Membranes prepared from SWNT powders | | | | Membranes prepared from SWNT gels | | | |
|---|---|---|---|---|---|---|---|---|
| SWNT vol % | pwd-1 11 | pwd-2 21 | pwd-3 31 | pwd-4 42 | gel-1 8 | gel-2 20 | gel-3 33 | gel-4 38 |
| $f_H$ at $2\theta = 4.6°$ | 0.07 | 0.04 | 0.01 | 0.08 | 0.08 | 0.09 | 0.08 | 0.08 |
| $f_H$ at $2\theta = 19.5°$ | 0.17 | * | * | * | 0.22 | 0.31 | 0.28 | 0.23 |

*For samples pwd-2, pwd-3, and pwd-4, the XRD scan intensity at $2\theta = 19.5°$ is too low to provide a statistically meaningful analysis of the PVA chain orientation.

TABLE 2

Intertubular distance, outer radius, and length of SWNTs in PVA/SWNT composite membranes prepared from SWNT gels.

|  | SWNT vol % | | | |
|---|---|---|---|---|
|  | 8 | 20 | 33 | 38 |
| d from theoretical calculation (nm) | 6.9 | 4.3 | 3.4 | 3.2 |
| d from SAXS analysis (nm) | 5.6 | 4.7 | 4.0 | 5.0 |
| $r_o$ from SAXS analysis (nm) | 1.15 | 1.15 | 1.12 | 1.20 |
| L from SAXS analysis (nm) | 380 | 550 | 580 | 500 |

TABLE 3

Parameters derived from the contact time measurements by the pure PVA and the gel-4 sample.

|  | $T_{1\rho}(^1H)$ (ms) | | $T_{CH}$ (ms) | |
|---|---|---|---|---|
|  | CHOH | $CH_2$ | CHOH | $CH_2$ |
| pure PVA membrane | 4.98 | 4.48 | 0.25 | 0.14 |
| gel-4 | 2.25 | 1.96 | 0.20 | 0.13 |

TABLE 4

The average and Standard Deviation of Silicon-to-Carbon Ratio for a Line Profile in PVA/SWNT Composite Membranes

| Si/C intensity ratio | Membranes prepared by SWNT powders | | | | Membranes prepared by SWNT gel | | | |
|---|---|---|---|---|---|---|---|---|
|  | pwd-1 | pwd-2 | pwd-3 | pwd-4 | gel-1 | gel-2 | gel-3 | gel-4 |
| Average | 1.7 | 0.4 | 6.36 | 5.9 | 0.16 | 0.27 | 0.39 | 0.46 |
| Standard Deviation | 3.3 | 0.97 | 6.69 | 6.1 | 0.05 | 0.05 | 0.09 | 0.08 |

TABLE 5

Mass fraction of SWNTs derived from gel-phased material in the PVA/SWNT composite membrane

|  | gel-1 | gel-2 | gel-3 | gel-1 |
|---|---|---|---|---|
| SWNT mass fraction in the membrane | 0.076 | 0.19 | 0.32 | 0.37 |

Extension to Thin Nanotube Membrane

Figure 14:
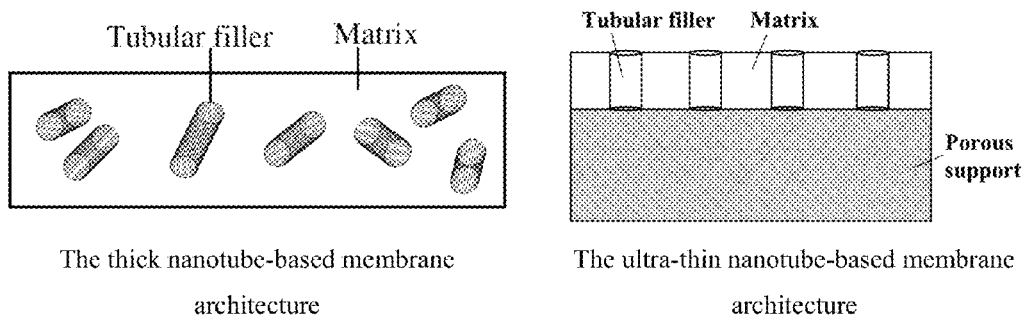
FIG. 14. Illustration of two nanotube-based membrane architectures.

FIG. 14 illustrates "thick" and "thin" nanotube-based membrane architectures. The key difference between these two architectures is the relative characteristic length between the thickness of the matrix layer and the tubular fillers. A nanotube-based composite membrane is considered "thick" when the matrix thickness is much larger than the average length of the incorporated tubular fillers. On the other hand, a nanotube membrane is considered "thin" when the matrix thickness is of the same order or smaller than the average length of the incorporated tubular fillers. Since such membranes are too thin to be self-supported, they also require a non-selective porous support layer with negligible permeation resistance to provide additional structural stability.

Figure 15:
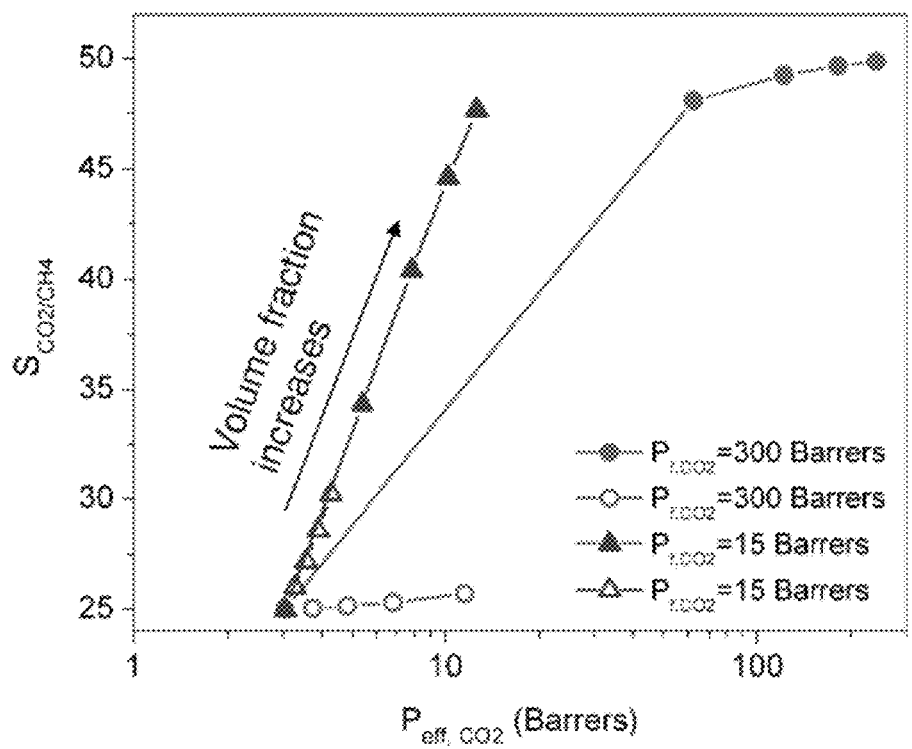
FIG. 15. Illustration of the effects of tubular fillers on the permeability and selectivity of cellulose acetate, for filler selectivity of 50. The open symbols represent the conventional composite membranes, and the solid symbols represent untra-thin membranes with tubular fillers spanning the thickness. In these plots, the filler volume fraction is the independent variable. For each curve, the five data points (from left to right) represent the filler volume fraction=0, 0.2, 0.4, 0.6, 0.8, respectively.

The thin membranes would allow the incorporated tubular fillers to directly connect the feed and permeate side. Hence the mass transport properties of the tubular fillers become the defining factor in governing the membrane performance. FIG. 15 compares the predicted molecular separation performance between two nanotube-based membrane architectures using recently developed models. The thin membrane shows substantially higher permeability, since transport is no longer limited by the matrix polymer. The good selectivity of the tubular fillers can be pronounced only in the thin membrane.

We now describe the experimental procedures for preparing the thin nanotube-based membranes using aluminosilicate nanotubes as tubular fillers, poly(vinyl alcohol) (PVA) as the matrix material, and porous poly(propylene) (PP) as the support layer.

Figure 16:
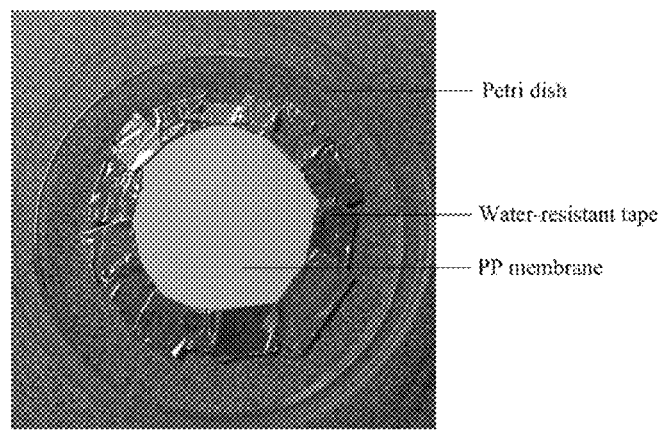
FIG. 16. Photo image of a PP membrane masked by water-resistant tapes.

1. Dissolve PVA in 30 mL DI water. The amount of PVA depends on the desired membrane thickness.
2. Mix the prepared PVA aqueous solution with the aluminosilicate nanotube synthesis gel. The synthesis of the aluminosilicate nanotubes is described in our previous work. The nanotube concentration in the synthesis gel is approximately 5 g/L.
3. Mask the perimeter of the PP porous membranes with water-resistant aluminum tapes on a 3.4 inch petri dish (FIG. 16). The mask prevents the nanotube membrane from coated on both sides of the PP support.
4. Pour the resulting nanotube/PVA solution into the petri dish containing a porous PP support.

5. Place the petri dish with nanotube/PVA solution in a 50° C. oven for 24 hours to form the nanotube/PVA membrane on the top of the PP support.

6. Use a razor to cut along the perimeter of the PP membrane for detaching the resulting bi-layer membrane composed of a thin nanotube/PVA membrane coated on a PP support.

Figure 17:
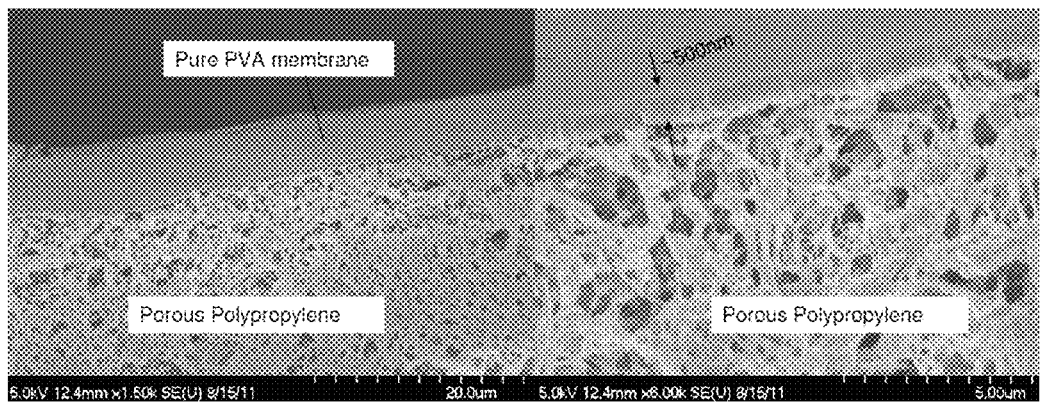
FIG. 17. SEM images of a ~500 nm pure PVA membrane coated on a porous PP support with low (left) and high (right) magnification.

FIG. 17 shows SEM images of a thin pure PVA membrane (~500 nm) coated on a porous PP support. The PVA layer shows a dense structure with a uniform membrane thickness and good adhesion to the PP support.

Figure 18:
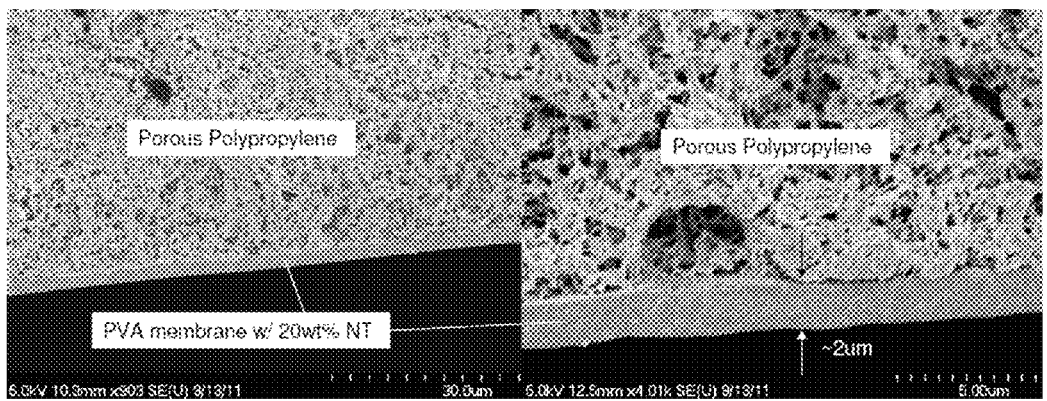
FIG. 18. SEM images of a ~2 μm nanotube/PVA membrane with 20 wt % nanotube coated on a porous PP support with low (left) and high (right) magnification.

FIG. 18 shows SEM images of an ultra-thin nanotube/PVA membrane (~2 μm and 20 wt % nanotube) coated on a porous PP support. The PVA layer shows a dense structure with a uniform membrane thickness and good adhesion to the PP support. The membrane thickness can be further reduced by decreasing the amount of PVA and nanotube gel when preparing The following references are incorporated by reference in their entirety.

1. Mukherjee, S.; Bartlow, V. A.; Nair, S. *Chem. Mater.* 2005, 17, 4900-4909.
2. Farmer, V. C.; Fraser, A. R.; Tait, J. M. *J. Chem. Soc. Chem. Commun.* 1977, 462-463.
3. Wada, S. I.; Eto, A.; Wada, K. *J. Soil Sci.* 1979, 30, 347-352.
4. Yang, H. X.; Wang, C.; Su, Z. H. *Chem. Mater.* 2008, 20, 4484-4488.
5. Yucelen, G. I.; Choudhury, R. P.; Vyalikh, A.; Scheler, U.; Beckham, H. W.; Nair, S. *J. Am. Chem. Soc.* 2011, 133, 5397-5412.
6. Zang, J.; Chempath, S.; Konduri, S.; Nair, S.; Sholl, D. S. *J. Phys. Chem. Lett.* 2010, 1, 1235-1240
7. Zang, J.; Konduri, S.; Nair, S.; Sholl, D. S. *ACS Nano* 2009, 3, 1548-1556.
8. Konduri, S.; Tong, H. M.; Chempath, S.; Nair, S. *J. Phys. Chem. C* 2008, 112, 15367-15374.
9. Kang, D.-Y.; Zang, J.; Wright, E. R.; McCanna, A. L.; Jones, C. W.; Nair, S. *ACS Nano* 2010, 4, 4897-4907.
10. Kang, D.-Y.; Jones, C. W.; Nair, S. *J. Membr. Sci.* 2011, 381, 50-63.
11. Konduri, S.; Mukherjee, S.; Nair, S. *ACS Nano* 2007, 1, 393-402.
12. Bac, B. H.; Song, Y.; Kim, M. H.; Lee, Y.-B.; Kang, I. M. *Inorganic Chem. Comm.* 2009, 12, 1045-1048.
13. Ma, W.; Otsuka, H.; Takahara, A. *Chem. Commun.* 2011, 47, 5813-5815.

What is claimed is:

1. A method of making a well dispersed metal oxide or metal sulphide single-walled nanotube (SWNT)/polymer composite material, comprising:
   a) preparing a gel-phase metal oxide or metal sulphide SWNT, comprising:
      a-1) mixing a stoichiometric amount of a metal source, oxide source, and a silicon source;
      a-2) adding an aqueous acid to mixture of step a-1), followed by stirring;
      a-3) diluting mixture of step a-2) with deionized water by factor of 3.5 to 4 and stirring the diluted mixture at an elevated temperature;
      a-4) adding a base to cooled mixture until gelation of suspended nanotubes occurs; and
      a-5) isolating the gel and re-dispersing the suspended nanotubes by adding a small amount of concentrated acid to the gel;
   b) mixing the gel-phase metal oxide or metal sulphide SWNT with a polymer; and
   c) obtaining a SWNT/polymer composite with at least 30 vol % of the metal oxide or metal sulphide SWNT in the polymer composite material, wherein the SWNT exist as a single nanotube or a small bundle of about <3 to 4 nanotubes.

2. The method of claim 1, wherein the SWNT/polymer composite has about 38 vol % of the metal oxide SWNT in the polymer composite material.

3. The method of claim 1, wherein the polymer is selected from the group consisting of crystalline polymers, semicrystalline polymers, glassy polymers, rubbery polymers, poly (vinyl alcohol), cellulose acetate, polyimides, polysulfones, polyalkylsiloxanes, poly(methyl methacrylate), poly(3-octylthiophene), poly-p-phenylene(vinylene), polyacrylonitrile, polybutadiene, polystyrene, polypropylene, polypyrrole, poly(p-phenylene benzobisoxazole), epoxy, and combinations thereof.

4. The method of claim 3, wherein the polymer is poly (vinyl alcohol).

5. The method of claim 1, wherein the SWNT is an aluminosilicate SWNT.

6. The method of claim 1, wherein the SWNT/polymer composite material is about ≤0.5 micron thick and is further supported with a second porous polymer layer.

7. The method of claim 5, wherein a-1) the metal source is an aluminum source; a-5) the concentrated acid is a concentrated hydrochloric acid.

8. The method in claim 7, wherein: a-1) the aluminum, oxide and silicone source are aluminum-tri-sec-butoxide and tetraethyl orthosilicate; a-2) the aqueous acid is perchloric acid; a-4) the base is 30 wt % ammonia solution.

9. The method of claim 5, wherein step a) comprises:
   a-1) mixing a stoichiometric amount of tetraethyl orthosilicate with aluminum-tri-sec-butoxide;
   a-2) adding an aqueous perchloric acid solution to the mixture of step a-1) with a molar ratio Si:Al:HClO$_4$ of about 1.1:2:1, followed by stirring;
   a-3) diluting the mixture of step 2) with deionized water by a factor of 3.5 to 4 and stirring the diluted mixture at an elevated temperature;
   a-4) adding a 30 wt % ammonia solution to cooled mixture until gelation of suspended nanotubes occurs; and
   a-5) isolating the gel and re-dispersing the suspended nanotubes by adding a small amount of concentrated hydrochloric acid to the gel.

10. The method of claim 7, wherein step a) further comprises:
    a-6) purifying the gel.

11. The method of claim 7, wherein the elevated temperature in step a-3) is at least 80° C.

12. The method of claim 1, wherein the step b) further comprises:
    b-1) crosslinking the SWNT and the polymer.

13. The method of claim 1, wherein the SWNT/polymer composite has about 30 to about 38 vol % of the metal oxide SWNT in the polymer composite.

14. The method of claim 13, wherein the SWNT is an aluminosilicate SWNT.

15. The method of claim 13, wherein the polymer is poly (vinyl alcohol).

16. The method of claim 1, wherein the SWNT/polymer composite has about 38 vol % of the metal oxide SWNT in the polymer composite.

17. The method of claim 1, wherein the metal oxide SWNT is aluminosilicate SWNT.

18. A method of making a well dispersed aluminosilicate single-walled nanotube (SWNT)/poly(vinyl alcohol) (PVA) composite material, comprising:
   a) preparing a gel-phase aluminosilicate SWNT, comprising
      a-1) mixing a stoichiometric amount of a metal source, oxide source, and a silicon source;
      a-2) adding an aqueous acid to mixture of step a-1), followed by stirring;
      a-3) diluting mixture of step a-2) with deionized water by factor of 3.5 to 4 and stirring the diluted mixture at an elevated temperature;

a-4) adding a base to cooled mixture until gelation of suspended nanotubes occurs;

a-5) isolating the gel and re-dispersing the suspended nanotubes by adding a small amount of concentrated acid to the gel; and a-6) purifying the gel;

b) mixing the gel-phase aluminosilicate SWNT with an aqueous solution of PVA, comprising:

b-1) crosslinking the SWNT and the polymer; and c) obtaining an aluminosilicate SWNT/PVA composite; wherein the aluminosilicate SWNT/PVA composite has at least 30 vol % of the aluminosilicate SWNT in the PVA composite material, wherein the SWNT exist as a single nanotube or as a small bundle of about ≤3 to 4 nanotubes.

19. The method of claim 18, further comprising d) supporting the SWNT/PVA composite with a second porous polymer layer.

20. The method of claim 18, wherein the SWNT directly connects both sides of the SWNT/PVA composite.

21. The method of claim 18, wherein the SWNT/PVA composite has about 30 to about 38 vol % of the metal oxide SWNT in the PVA composite and wherein the SWNT directly connects both sides of the SWNT/PVA composite.

* * * * *

UNITED STATES PATENT AND TRADEMARK OFFICE
CERTIFICATE OF CORRECTION

PATENT NO. : 9,174,842 B2  Page 1 of 1
APPLICATION NO. : 13/608768
DATED : November 3, 2015
INVENTOR(S) : Sankar Nair, Dun-Yen Kang and Christopher W. Jones It is certified that error appears in the above-identified patent and that said Letters Patent is hereby corrected as shown below:

In the Claims:

Column 21, Line 66: Claim 1.c) line 4 reading "small bundle of <3 to 4 nanotubes." should be corrected to read -- small bundle of ≤3 to 4 nanotubes. --

Signed and Sealed this
Twenty-ninth Day of March, 2016

Michelle K. Lee
*Director of the United States Patent and Trademark Office*